US012673326B2

(12) United States Patent
Baggio et al.

(10) Patent No.: US 12,673,326 B2
(45) Date of Patent: Jul. 7, 2026

(54) LABORATORY INSTRUMENT WITH SAFETY INDICATOR

(71) Applicant: Roche Molecular Systems, Inc., Pleasanton, CA (US)

(72) Inventors: Fabian Baggio, Mollis (CH); Felix Geiselbrecht, Emmen (CH); Roger Spescha, Kriens (CH); Ivo Daniel Vicente Leitao, Steinhausen (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 671 days.

(21) Appl. No.: 18/056,552

(22) Filed: Nov. 17, 2022

(65) Prior Publication Data

US 2023/0149935 A1 May 18, 2023

(30) Foreign Application Priority Data

Nov. 17, 2021 (EP) .................................... 21208671

(51) Int. Cl.
*B01L 3/00* (2006.01)

(52) U.S. Cl.
CPC ............... *B01L 3/523* (2013.01); *B01L 3/545* (2013.01); *B01L 2300/0627* (2013.01)

(58) Field of Classification Search
CPC .. B01L 3/523; B01L 3/545; B01L 2300/0627; B01L 1/00; B01L 9/00; G01N 35/00712; G01N 2035/00306; G01N 2035/009; G01N 2035/0498; G01N 35/00; G01N 35/00584
See application file for complete search history.

(56) References Cited

U.S. PATENT DOCUMENTS

| | | | |
|---|---|---|---|
| 11,112,418 | B1 | 9/2021 | Holmes et al. |
| 2005/0062238 | A1 | 3/2005 | Broadfield et al. |
| 2013/0070090 | A1 | 3/2013 | Bufalini et al. |

FOREIGN PATENT DOCUMENTS

| | | | |
|---|---|---|---|
| EP | 895088 | B1 | 6/2006 |
| EP | 3032263 | A1 | 6/2016 |
| EP | 3025740 | B1 | 9/2020 |

OTHER PUBLICATIONS

Extended European Search Report, for EP Application No. 21208671.4.

*Primary Examiner* — Samuel P Siefke
(74) *Attorney, Agent, or Firm* — Maneesh Gupta

(57) ABSTRACT

A laboratory instrument for processing at least one sample is disclosed. The laboratory instrument includes at least one housing having at least one sample processing device disposed therein, at least one reagent storage compartment reversibly removable from the housing, and at least one safety indicator. The safety indicator is configured for indicating if the reagent storage compartment has been removed from the housing and reinserted into the housing. The laboratory instrument is configured for automatically altering a detectable state of the safety indicator during the process of removing and reinserting the reagent storage compartment.

8 Claims, 6 Drawing Sheets

LABORATORY INSTRUMENT WITH SAFETY INDICATOR

CROSS-REFERENCE TO RELATED APPLICATION

This application claims the benefit of priority of European Application Serial No. 21208671.4, filed Nov. 17, 2021, the disclosure of which is incorporated herein by reference.

TECHNICAL FIELD

The present invention relates to a laboratory instrument for processing at least one sample and to a method of operating the laboratory instrument. The laboratory instrument and the method specifically may be applied in the field of automated in vitro diagnostic (IVD) sample processing. Specifically, invention may be used for analyzing samples of a human body, like blood, urine, saliva, interstitial fluid or other bodily fluids. Other applications, however, are also feasible.

BACKGROUND

In diagnostic laboratories, automated pre-analytical, analytical, and post-analytical laboratory instruments are used for various sample processing steps, specifically to produce accurate and reliable test results which represent pivotal information for physicians. Typically, such laboratory instruments are equipped with one or more sample processing devices disposed therein, such as one or more pipetting devices and the like. Further, one or more sample handling devices, such as conveyors may be present.

For processing the at least one sample, typically, various types of reagents are used by the laboratory instruments. These reagents, typically, are positioned in one or more reagent storage compartments. As an example, in commercially available laboratory instruments, reagent cassettes may be stored inside one or more so-called “Reagent Supply Units” (RSU). These reagent storage compartments are typically positioned in a housing of the laboratory instrument and are easily accessible.

One technical challenge with typical reagent storage compartments, however, resides in the fact that the laboratory instrument, typically automatically accesses the reagents disposed in the reagent storage compartment. Therefore, however, a teaching process is generally required, in order to teach the laboratory instrument the content and positioning of the reagent storage compartment. By this teaching process, also referred to as a “training process”, for example, pipetting needles of the laboratory instrument may correctly address appropriate containers inside the reagent storage compartment, without the risk of collisions or misplacement. Still, one technical challenge resides in the fact that, after removal of the reagent storage compartment and reinsertion into the laboratory instrument, a new teaching process is required, since the content and/or the arrangement of the reagent storage compartment may have changed.

In the art of medical engineering, various systems comprising reagent compartments such as drawers are known. Thus, as an example, EP3025740B1 discloses a dialysis system including a housing, a dialysate pump disposed in the housing, and a dialysate line configured to be operatively connected to the dialysate pump such that the dialysate pump can pump dialysate through the dialysate line when the dialysate line is in fluid communication with a dialysate source. The dialysis system includes a hemodialysis machine having a drawer, wherein a manual opening of the drawer is enabled under specific conditions.

In case reagent storage compartments are used, technical challenges may occur in the case of a loss of electrical power. Specifically, since reagents stored in the reagent storage compartment typically are of high commercial value, it may be necessary to retrieve the reagents from the system, in order to securely store these reagents, e.g. under controlled conditions. In the art, various systems are known addressing this issue.

US20050062238A1 discloses a point-of-care (POC) station that comprises a mobile cabinet with securable compartments and a pylon release mechanism. The POC station also comprises an immovable pylon, an articulated arm, and a terminal having a monitor. The POC station extends the medication and supply infrastructure into the patient room. The station also comprises drawers and is configured for unlocking the drawer even in case there is a loss of power to the system.

EP895088B1 discloses a blood analysis system or instrument, generally, including an incubator station, a sample and reagent holding station, a pipette assembly, a centrifuge, an analysis station, and a transport assembly. Generally, the incubation station holds containers while reagents and fluids are being dispensed in those containers, and, if desired, for incubating the containers. The sample and reagent holding station holds samples and a plurality of reagents, and the pipette assembly transfers fluids from that sample and reagent holding station to containers in the incubation station. The centrifuge is provided for centrifuging the container, and the analysis station is provided to analyze the containers optically to identify reactions therein. The transport assembly carries the containers between the incubator station, the centrifuge, and the analysis station. Preferably, the pipette assembly is automatically operated to draw fluids and preselected reagents from the sample and reagent holding station, and to dispense fluids into the containers held in the incubation station to produce predetermined solutions therein. Also, the transport subassembly is automatically operated to carry containers from the incubator station to the centrifuge after the predetermined solutions have been produced in the containers, and then to carry the containers from the centrifuge to the analysis station. The system also includes a drawer and means for opening the drawer in case of a loss of power.

Despite the advantages achieved by the above-mentioned technical developments, various technical challenges remain. Specifically, during power outages, an altering of the system or instrument may take place unnoticed. Thus, as an example, the at least reagent storage compartment may have been removed and reinserted, without notice given to the instrument or system. This option, however, may induce the risk of damage, since a rearrangement of the reagent storage compartment and/or its contents may require a different operation and/or a renewed teaching process of the instrument or system. However, performing a routine initial teaching process every time the instrument or system is powered up is highly time-consuming and reduces user convenience.

It is therefore desirable to provide a laboratory instrument and a method of operating the same which at least partially address the above-mentioned technical challenges. Specifically, a secure handling shall be possible, even in case of a power outage, which allows for a safe retrieval of reagents from a reagent storage compartment and which still allows for a safe and convenient restart of the laboratory instrument.

SUMMARY

Accordingly, a laboratory instrument for processing at least sample is disclosed. The laboratory instrument includes at least one housing having at least one sample processing device disposed therein, at least one reagent storage compartment reversibly removable from the housing, and at least one safety indicator. The safety indicator is configured for indicating if the reagent storage compartment has been removed from the housing and reinserted into the housing. The laboratory instrument is configured for automatically altering a detectable state of the safety indicator during the process of removing and reinserting the reagent storage compartment.

In an aspect, the laboratory instrument is electrically operable in a powered state, wherein the reagent storage compartment is reversibly removable from the housing in an unpowered state, wherein the safety indicator is configured for indicating if the reagent storage compartment has been removed from the housing and reinserted into the housing during a period in which the laboratory instrument was unpowered.

In an aspect, the laboratory instrument includes at least one control unit configured for receiving and evaluating at least one readout signal indicating a state of the safety indicator. The control unit may be configured for performing at least one automatic teaching procedure when the readout signal indicates that the reagent storage compartment has been removed from the housing and reinserted into the housing.

In an aspect, the safety indicator includes at least one movable indicator element, the movable indicator element being configured for being brought into at least one armed position and into at least one disarmed position, wherein the laboratory instrument further comprises at least one readout unit for detecting whether the movable indicator element is in the armed position or in the disarmed position.

In a further aspect, the laboratory instrument further includes at least one compartment actuator, wherein the compartment actuator is configured for bringing the movable indicator element from the armed position into the disarmed position when the reagent storage compartment is removed from the housing, wherein the compartment actuator is further configured for leaving the movable indicator element in the disarmed position when the reagent storage compartment is reinserted into the housing. The compartment actuator may be a mechanical compartment actuator mechanically acting on the movable indicator element.

In a further aspect, the laboratory instrument further includes at least one indicator actuator, wherein the indicator actuator is configured for bringing the movable indicator element into the armed position.

In a further aspect, the laboratory instrument is configured for mechanically bringing the movable indicator element from the armed position into the disarmed position when the reagent storage compartment is removed from the housing, wherein the laboratory instrument is further configured for leaving the movable indicator element in the disarmed position when the reagent storage compartment is reinserted into the housing, wherein the laboratory instrument is further configured for performing at least one automatic teaching procedure when the movable indicator element is detected to be in the disarmed position and further is configured for bringing the movable indicator element back into the armed position.

In a further aspect, the movable indicator element comprises at least one rotatable movable indicator element, wherein the armed position and the disarmed position are different rotational positions of the rotatable movable indicator element. The rotatable movable indicator element may include at least one toothed wheel having at least one tooth, wherein the reagent storage compartment is configured to mechanically act upon the tooth of the toothed wheel when the reagent storage compartment is removed from the housing, wherein the reagent storage compartment further is configured not to act upon the tooth of the toothed wheel when the reagent storage compartment is reinserted into the housing. For example, the toothed wheel may include at least two teeth, wherein the reagent storage compartment is configured to mechanically act upon at least a first tooth of the teeth, wherein the readout unit further is configured for detecting at least a second tooth of the teeth.

A method of operating the laboratory instrument is also disclosed. The method includes:

- receiving at least one readout signal from the safety indicator;
- checking if the readout signal indicates that the reagent storage compartment has been removed from the housing; and
- depending on the result of step ii., performing at least one automatic teaching procedure of the laboratory instrument.

DETAILED DESCRIPTION

Figure 1:
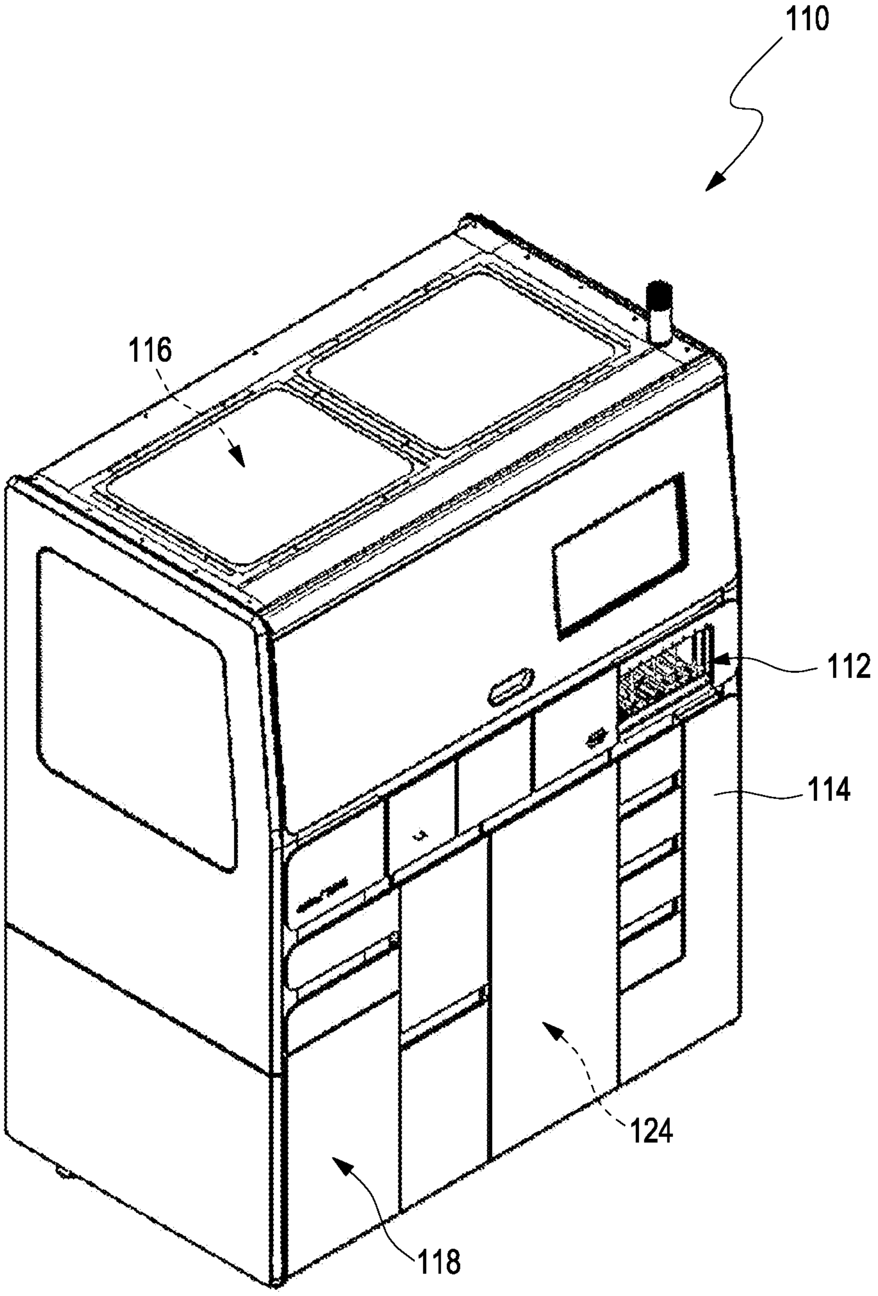
FIG. 1 shows a perspective view of an embodiment of a laboratory instrument.

In a first aspect of the invention, a laboratory instrument for processing at least one sample is proposed. The laboratory instrument comprises:

- a. at least one housing having at least one sample processing device disposed therein;
- b. at least one reagent storage compartment reversibly removable from the housing, and c. at least one safety indicator, specifically at least one electronically readable safety indicator, the safety indicator being configured for indicating if the reagent storage compartment has been removed from the housing and reinserted into the housing, wherein the laboratory instrument is configured for automatically altering a detectable state of the safety indicator during the process of removing and reinserting the reagent storage compartment.

The term "laboratory instrument" as used herein is a broad term and is to be given its ordinary and customary meaning to a person of ordinary skill in the art and is not to be limited to a special or customized meaning. The term specifically may refer, without limitation, to any device or system configured for performing one or more sample or sample vessel processing steps. For example, the laboratory instrument may be or may comprise a clinical diagnostic analyzer, specifically an automatic analyzer. For possible embodiments of the laboratory instrument, reference may be made to the prior art as described above or to commercially available laboratory instruments, such as laboratory instruments of the Roche Cobas® series. Other embodiments are feasible.

The laboratory instrument comprises at least one sample processing device, such as one or more of a pre-analytical, an analytical, or a post-analytical instrument. A pre-analytical instrument can usually be used for the preliminary processing of samples or sample vessels. An analytical instrument can be designed, for example, to use a sample or part of the sample and a reagent in order to produce a measurable signal, on the basis of which it is possible to determine whether the analyte is present, and if desired in what concentration. A post-analytical instrument can usually be used for the post-processing of samples like the archiving of samples.

The laboratory instrument, specifically the at least one sample processing device, as an example, may comprise at least one of: a pipetting device for pipetting a sample; a sorting device for sorting samples or sample vessels; a cap removal device for removing caps or closures on sample vessels; a cap fitting device for fitting caps or closures on sample vessels; an aliquoting device for aliquoting samples; a centrifuging device for centrifuging samples; an analyzing device for analyzing a sample; a heating device for heating a sample; a cooling device for cooling a sample; a mixing device for mixing a sample; a separation device for isolating an analyte of the sample; a storing device for storing samples; an archiving device for archiving samples; a sample vessel type determination device for determining a sample vessel type; a sample quality determination device for determining a sample quality. Additionally or alternatively, the laboratory instrument may comprise at least one sample handling system for handling the sample, specifically automatically, and/or for handling at least one sample vessel, such as at least one sample tube. Thus, as an example, the laboratory instrument may comprise at least one gripper, at least one conveyor, at least one rotator or the like. Further, additionally or alternatively, the laboratory instrument may comprise at least one detector for detecting at least one property of the at least one sample, such as an optical property. Thus, as an example, the laboratory instrument may comprise at least one fluorescence detector. Other options are feasible.

The term "sample" as used herein is a broad term and is to be given its ordinary and customary meaning to a person of ordinary skill in the art and is not to be limited to a special or customized meaning. The term specifically may refer, without limitation, to an aliquot of at least one material to be processed, specifically at least one material suspected of containing an analyte of interest. The sample can be derived from any biological source, such as a physiological fluid, including, blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma from blood, diluting viscous fluids, lysis or the like; methods of treatment can involve filtration, distillation, concentration, inactivation of interfering components, and the addition of reagents. A sample may be used directly as obtained from the source or following a pretreatment to modify the character of the sample, e.g. after being diluted with another solution or after having being mixed with reagents e.g. to carry out one or more diagnostic assays like e.g. clinical chemistry assays, immunoassays, coagulation assays, nucleic acid testing, etc. The term "sample" as used herein is therefore not only used for the original sample but also relates to a sample which has already been processed or preprocessed, such as pipetted, diluted, mixed with reagents, enriched, having been purified, having been amplified and the like. As used herein, the term "analyte" may refer to the compound or composition to be detected or measured.

The term "processing a sample" as used herein is a broad term and is to be given its ordinary and customary meaning to a person of ordinary skill in the art and is not to be limited to a special or customized meaning. The term specifically may refer, without limitation, to any treatment of the sample. For example, the processing may comprise one or more of transferring, aliquoting, isolating, purifying, incubating, reacting a sample or combining a reagent with a sample. The term "reagent" as used herein is a broad term and is to be given its ordinary and customary meaning to a person of ordinary skill in the art and is not to be limited to a special or customized meaning. The term specifically may refer, without limitation, to a composition required for treatment of a sample. Reagents may be any liquid, e.g. a solvent or chemical solution, which needs to be mixed with a sample and/or other reagent in order e.g. for a reaction to occur, or to enable detection. A reagent may be for example a diluting liquid, including water, it may comprise an organic solvent, it may comprise a detergent, it may be a buffer. Reagents may also be dry reagents adapted e.g. to be dissolved by a sample, another reagent or a diluting liquid. A reagent in the more strict sense of the term may be a liquid solution containing a reactant, typically a compound or agent capable e.g. of binding to or chemically transforming one or more analytes present in a sample. Examples of reactants are enzymes, enzyme substrates, conjugated dyes, protein-binding molecules, nucleic acid binding molecules, antibodies, chelating agents, promoters, inhibitors, epitopes, antigens, etc.

As further outlined above, the laboratory instrument comprises at least one housing having at least one sample processing device disposed therein. The term "housing" as used herein is a broad term and is to be given its ordinary and customary meaning to a person of ordinary skill in the art and is not to be limited to a special or customized meaning. The term specifically may refer, without limitation, to a device or element which fully or partially surrounds at least one interior space which may fully or partially be filled with one or more components, wherein the housing may be configured for providing protection against mechanical and/or environmental influences onto these components. The housing, as an example, may fully or partially be made of at least one rigid material, such as at least one of a metallic material, a rigid plastic material and glass. The housing may comprise at least one frame which may fully or partially be covered with one or more housing plates such as plastic plates and/or stainless steel plates. The housing may consist of a single part or may be composed of a plurality of housing components, such as a base and a cover. As an example, the housing of the laboratory instrument may comprise a base and a cover which may fully or partially be transparent.

As outlined above, within the housing, at least one sample processing device is disposed. The term "sample processing device" as used herein is a broad term and is to be given its ordinary and customary meaning to a person of ordinary skill in the art and is not to be limited to a special or customized meaning. The term specifically may refer, without limitation, to a device which is configured for performing one or more of the above-defined processing steps for processing at least one sample. As an example, the at least one sample processing device may be or may comprise at least one device configured for at least one of transferring, aliquoting, isolating, purifying, incubating, reacting a sample or combining a reagent with a sample. Specifically, the at least one sample processing device may comprise at least one pipetting device. Further, additionally or alternatively, the at least one sample processing device may also comprise at least one detector.

As further outlined above, the laboratory instrument comprises at least one reagent storage compartment which is reversibly removable from the housing. The term "reagent storage compartment" as used herein is a broad term and is to be given its ordinary and customary meaning to a person of ordinary skill in the art and is not to be limited to a special or customized meaning. The term specifically may refer, without limitation, to a container configured for storing and providing one or more reagents to the laboratory instrument. The reagent storage compartment may contain at least one integrated robotic handler for handling at least one or more reagents and/or reagent vessels. As an example, the reagent storage compartment may comprise at least one robotic handler configured for managing a pick-and-place of at least one reagent and/or reagent vessel inside the reagent storage compartment. Additionally or alternatively, the reagent storage compartment may comprise at least one temperature control device configured for adjusting and/or controlling at least one temperature of at least one reagent and/or at least one reagent vessel within the reagent storage compartment. Thus, as an example, the reagent storage compartment may comprise one or more temperature controlling elements, as for example for heating and cooling inside one or more zones of the reagent storage compartment. The reagents, as an example, may be provided in one or more reagent vessels disposed in the reagent storage compartment. The reagent storage compartment specifically may at least partially be open, such that, when the container is inserted into the laboratory instrument, the one or more reagents and/or reagent vessels may be accessible for other components of the laboratory instrument, such as one or more suction pipes and/or pipetting devices. The reagent storage compartment, specifically and as will be outlined in further detail below, may comprise one or more drawers.

For being reversibly removable from the housing, the housing and/or the container each may comprise one or more connecting elements which are configured for connecting the container to the housing. As an example, one or more sliders may be provided, for sliding the reagent storage compartment in and out of the housing. As used herein, generally, the term "inserted into the housing" specifically may be intended to describe a state in which the reagent storage compartment is fully disposed in the housing and/or is attached to the housing, such that the reagent storage compartment is in its place of operation, thereby providing the one or more reagents contained therein to the laboratory instrument, for the purpose of the processing of the sample. Contrarily, the term "removed from the housing" specifically may describe a state in which the reagent storage compartment is not fully inserted into the housing and/or in which the reagent storage compartment is not in place for providing the one or more reagents contained therein to the laboratory instrument for use in the processing of the sample. Thus, in the removed state, the reagent storage compartment may be fully detached from the housing or may partially be still attached to the housing, without, however, being in its place of operation, and, thereby, not providing the one or more reagents contained therein to the laboratory instrument, for the purpose of the processing of the sample. As an example, in case the reagent storage compartment comprises a drawer, the term specifically may refer to a situation in which the drawer is fully or partially pulled out of the housing, even though one end of the drawer may still fully or partially be located inside the housing.

As further used herein, the term "reversibly" is a broad term and is to be given its ordinary and customary meaning to a person of ordinary skill in the art and is not to be limited to a special or customized meaning. The term specifically may refer to the fact that the reagent storage compartment may be removed from the housing and, afterwards, may be reinserted into the housing, or vice a versa. Specifically, the removal and/or the insertion may not lead to an irreversible alteration of the reagent storage compartment, such as by breaking breakable elements or the like. The term "reversibly" further does not affect the possibility of changing the contents of the reagent storage compartment between removing and reinserting the reagent storage compartment. When reinserting the reagent storage compartment into the housing, the same reagent storage compartment may be reinserted or, alternatively, another reagent storage compartment may be reinserted which, however, at least in terms of its dimensions and/or mechanical properties, is at least substantially identical to the one that previously, was removed from the housing.

The laboratory instrument, as further outlined above, further comprises at least one safety indicator, specifically at least one electronically readable safety indicator. The safety indicator is configured for indicating if the reagent storage compartment has been removed from the housing and reinserted into the housing. The laboratory instrument is configured for automatically altering a detectable state of the safety indicator during the process of removing and reinserting the reagent storage compartment.

As used herein, the term "safety indicator" is a broad term and is to be given its ordinary and customary meaning to a person of ordinary skill in the art and is not to be limited to a special or customized meaning. The term specifically may refer to an arbitrary device which is configured for providing at least one indication, specifically at least one machine-readable indication, such as a signal, indicating whether the reagent storage compartment has been removed from the housing and reinserted into the housing. As will be outlined in further detail below, the indication may refer to a specific time period, such as a time period elapsed since the most recent reset of the safety indicator. Thus, as will be outlined in further detail below, the laboratory instrument may be configured for resetting the safety indicator, thereby, as an example, bringing the safety indicator into a defined state, such as an armed state, specifically an armed position. At a later stage, after the reset, the safety indicator may indicate whether the reagent storage compartment has been removed from the housing and reinserted into the housing since the most recent reset, e.g. by indicating whether the safety indicator is still in the armed state, such as in the armed position, or in a different state, such as in a disarmed state, specifically a disarmed position. Further examples will be given below.

The safety indicator, as will be outlined in further detail below, may assume at least two different states, such as at least one armed state and at least one disarmed state. The state specifically may be detectable by at least one detector. Specifically, the stage may be electronically readable. As used herein, the term "electronically readable" is a broad term and is to be given its ordinary and customary meaning to a person of ordinary skill in the art and is not to be limited to a special or customized meaning. The term specifically may refer to the fact that the state of the safety indicator may be detected by electronic means, such as at least one electronic detector, e.g., at least one optoelectronic detector. The detector, as an example, may be part of a readout unit of a safety device comprising, at least, the safety indicator and the readout unit with the at least one detector. The at least one detector, as an example, may comprise at least one of an electronic detector, an electromagnetic detector and an optical detector. Specifically, as outlined above, the safety indicator may be part of a safety device, comprising, besides the at least one safety indicator, at least one readout unit which is configured for electronically reading out a state of the safety indicator, thereby, as an example, generating at least one item of information about the removal and reinsertion of the reagent storage compartment from the safety indicator, specifically in the time period since the most recent reset. Thus, the safety device may provide at least one readout unit, which may be configured for providing an electronic signal configured for providing information on whether the reagent storage compartment has been removed from the housing and reinserted into the housing, specifically since a most recent reset. As an example, the electronic signal may be an analogue and/or a digital signal. The safety device may also comprise at least one storage element, such as at least one data storage device, which may be configured for storing information on whether the reagent storage compartment has been removed from the housing and reinserted into the housing, specifically since a most recent reset. As an example, the information may be or may contain a binary information. Generally, the safety device may be configured for providing at least one item of electronic information on whether the reagent storage compartment has been removed from the housing and reinserted into the housing, specifically since a most recent reset, wherein the at least one item of electronic information may be electronically readable such that an external device, such as a control unit, may retrieve information on whether the reagent storage compartment has been removed from the housing and reinserted into the housing, specifically since a most recent reset, specifically machine-readable information.

As outlined above, the laboratory instrument is configured for automatically altering a detectable state of the safety indicator during the process of removing and reinserting the reagent storage compartment. The term "detectable state", as used herein, is a broad term and is to be given its ordinary and customary meaning to a person of ordinary skill in the art and is not to be limited to a special or customized meaning. The term specifically may refer to an arbitrary property of an element or device which may assume at least two different configurations, which are distinguishable by using at least one detector. Thus, the safety indicator may be configured for assuming at least two distinguishable states. The states, as an example, may be configurations, such as positions, of the safety indicator, including the option of different orientations of the safety indicator. Thus, as an example, the safety indicator may assume at least one first state, also referred to as an "armed state" or, specifically in case the state is a specific position, an "armed position", indicating that the reagent storage compartment has not been removed from the housing and reinserted into the housing, specifically since a most recent reset. Further, the safety indicator may assume at least one second state, also referred to as a "disarmed state" or, specifically in case the state is a specific position, a "disarmed position", the second state being different from the first state, the second state indicating that the reagent storage compartment has been removed from the housing and reinserted into the housing, specifically since the most recent reset.

The term "automatically altering", as used herein, is a broad term and is to be given its ordinary and customary meaning to a person of ordinary skill in the art and is not to be limited to a special or customized meaning. The term specifically may refer to the fact that a state of at least one object is changed without the necessity of human interaction, and, specifically without any human interaction at all. Thus, as an example, the automatic altering may imply that the altering is mechanically coupled to another action, which may be performed by a machine or by a user, specifically without, however, specifically or intentionally initiating the altering. Thus, as an example, when a user removes and/or reinserts the reagent storage compartment, the altering of the state of the safety indicator, by the laboratory instrument, may be coupled to the removal and/or the reinsertion. As an example, as will be outlined in further detail below, the laboratory instrument, or, specifically, the reagent storage compartment may comprise at least one actuation element or actuator, such as a lever, which couples the removal and/or the reinsertion to the alteration of the state of the safety indicator. Thus, even though the process of removal and/or reinsertion may be performed manually, the coupling of the altering of the detectable state of the safety indicator to the removal and/or reinsertion may provide for an automatic altering of the detectable state during the process of removing and reinserting the reagent storage compartment. Thus, generally, the automatic altering of the detectable state may imply a coupling of the altering of the detectable state to the process of removal and reinsertion of the reagent storage compartment. The altering may take place during the removal of the reagent storage compartment from the housing, during the reinsertion of the reagent storage compartment into the housing, or both.

As outlined above, the laboratory instrument specifically may be electrically operable in a powered state. Thus, from an external and/or an internal electrical power source, electrical energy may be provided to the laboratory instrument, specifically for driving the at least one sample processing device.

The reagent storage compartment specifically may be reversibly removable from the housing in a powered state and/or in an unpowered state of the laboratory instrument. Both options are feasible. The reagent storage compartment specifically may be reversibly removable from the housing in an unpowered state, i.e. in a state in which the laboratory instrument is one or more of switched off, in a sleeping mode and in a mode in which no external or internal electrical power is provided to the laboratory instrument. For reversibly removing the reagent storage compartment from the housing in the unpowered state, the laboratory instrument specifically may be configured such that the reversible removal of the reagent storage compartment does not depend on any electrically powered devices and/or is possible without the use of electrically powered devices. Thus, as an example, a mechanical lock may be provided which has to be unlocked before removal, wherein the mechanical lock may not depend on electrical power. Thus, even in case of a power failure, the reagent storage compartment may be removed from the housing by an operator, e.g. for the purpose of securing the valuable contents of the reagent storage compartment, e.g. for securing the at least one reagent and/or reagent vessel contained therein.

The safety indicator specifically may be configured for detecting and/or indicating if the reagent storage compartment has been removed from the housing and reinserted into the housing during a period in which the laboratory instrument was unpowered. Thus, specifically, the safety indicator may be configured for generating the information on whether the reagent storage compartment has been removed from the housing and reinserted into the housing during the period in which the laboratory instrument was unpowered independent from an electrical power source. Thus, specifically, a state of the safety indicator may be altered or switched from an armed state into a disarmed state when the reagent storage compartment is removed from the housing, without the necessity of electrical power being provided to the safety indicator. The altering, as discussed above, takes place automatically, i.e. without the necessity of a separate user action for altering the state, e.g. by mechanically coupling the altering of the state to the removal and/or reinsertion process.

The state of the safety indicator specifically may be altered automatically when the reagent storage compartment is removed from the housing, e.g. from the armed state into the disarmed state. The laboratory instrument, as will be outlined below, may further be configured for not switching the state of the safety indicator back from the disarmed state into the armed state when the reagent storage compartment is reinserted into the housing. Thereby, without the necessity of electrical power being provided to the safety indicator, the safety indicator may provide the required information, specifically when the laboratory instrument is brought back into the powered state. Thus, even though the safety indicator may not provide the information indicating if the reagent storage compartment has been removed from the housing and reinserted into the housing during the unpowered state, the safety device, by using the safety indicator, still may be configured for gathering said information during the unpowered state, for storing said information, and for providing said information, specifically in an electronically readable format, when the laboratory instrument is brought back into the powered state. The safety device even may comprise at least one power source of its own, such as a battery and/or an accumulator, which may be configured for providing electrical energy to the safety indicator even in an unpowered state of the laboratory instrument, wherein the power source of the safety indicator does not affect the powered or unpowered state of the laboratory instrument. Specifically, however, the safety indicator may not contain any electrical power source of its own, as will be outlined in further detail below.

The laboratory instrument specifically may comprise at least one control unit. The term "control unit" as used herein is a broad term and is to be given its ordinary and customary meaning to a person of ordinary skill in the art and is not to be limited to a special or customized meaning. The term specifically may refer, without limitation, to an arbitrary electronic device or combination of devices configured for controlling one or more operations of the laboratory instrument, such as for controlling one or more processing steps of the laboratory instrument. The control unit, specifically, may comprise at least one processor. The term "processor" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the processor may be configured for processing basic instructions that drive the computer or system. As an example, the processor may comprise at least one arithmetic logic unit (ALU), at least one floating-point unit (FPU), such as a math co-processor or a numeric co-processor, a plurality of registers, specifically registers configured for supplying operands to the ALU and storing results of operations, and a memory, such as an L1 and L2 cache memory. In particular, the processor may be a multi-core processor. Specifically, the processor may be or may comprise a central processing unit (CPU). Additionally or alternatively, the processor may be or may comprise a microprocessor, thus specifically the processor's elements may be contained in one single integrated circuitry (IC) chip. Additionally or alternatively, the processor may be or may comprise one or more application-specific integrated circuits (ASICs) and/or one or more field-programmable gate arrays (FPGAs) and/or one or more tensor processing unit (TPU) and/or one or more chip, such as a dedicated machine learning optimized chip, or the like. The processor specifically may be configured, such as by software programming, for performing one or more evaluation operations.

The control unit specifically may be configured for receiving and evaluating at least one readout signal indicating a state of the safety indicator. As an example, the readout signal may be received from a readout unit of the safety device, comprising, besides the safety indicator, the at least one readout unit. Thus, as outlined above, the safety device may be configured for providing at least one item of information indicating if the reagent storage compartment has been removed from the housing and reinserted into the housing, specifically since a most recent reset, e.g. since a most recent reset process during which the safety indicator has been brought into an armed state, specifically the armed position. The item of information, as an example, may comprise at least one of an analog item of information and a digital item of information. The item of information also may be referred to as a "readout signal" provided by the safety indicator, independent on whether the readout signal is in an analog format or in a digital format. The readout signal may be or may comprise at least one item of information on a state of the safety indicator, such as a current state, such as an item of information indicating whether, presently, the safety indicator is in an armed state or in a disarmed state. Thus, the readout signal may be a readout signal which is directly or indirectly provided by a measurement device of the safety indicator and/or may be a readout signal which intermediately has been stored in a data storage device, e.g. a data storage device of the safety indicator.

After receiving the readout signal, directly or indirectly from the safety indicator, the control unit may evaluate the readout signal. Thus, as will be outlined in further detail below, the control unit may detect whether the reagent storage compartment has been removed from the housing and reinserted into the housing, e.g. during a time period in which the laboratory instrument has been in an unpowered state and/or during a time period since the most recent reset. The result of the evaluation, as an example, may be used by the control unit for initiating one or more actions, e.g. in case the reagent storage compartment has been removed from the housing and reinserted into the housing. As an example, a warning may be given knowledge to a user.

Further, additionally or alternatively, the control unit may be configured for performing at least one automatic teaching procedure when the readout signal indicates that the reagent storage compartment has been removed from the housing and reinserted into the housing. The term "automatic teaching procedure" as used herein is a broad term and is to be given its ordinary and customary meaning to a person of ordinary skill in the art and is not to be limited to a special or customized meaning. The term specifically may refer, without limitation, to a process which performed automatically, i.e. initiated by the control unit and preferably without the necessity of user interaction, in which at least one item of information is gathered on at least one of the content, the arrangement and the constitution of the reagent storage compartment and/or its contents. Specifically, the teaching procedure may comprise an adaption of the at least one processing step of the at least one sample by using the sample processing device to the at least one item of information on the reagent storage compartment. Thus, as an example, the teaching procedure may comprise information on whether and how at least one pipetting device may access at least one reagent vessel contained in the reagent storage compartment. As outlined above, the at least one control unit may also be distributed over the laboratory instrument. Thus, as an example, the control unit may comprise at least one part integrated into the housing, and at least one part integrated into the reagent storage compartment. Specifically, the at least one part of the control unit integrated into the housing may be configured for performing at least one automatic teaching procedure when the readout signal indicates that the reagent storage compartment has been removed from the housing and reinserted into the housing. It shall be noted, however, that other options are feasible as well. Thus, as an example, additionally or alternatively, the at least one optional part of the control unit integrated into the reagent storage compartment may also be configured for performing at least one automatic teaching procedure, which may be an additional teaching procedure or an alternative teaching procedure, which specifically may be performed when the readout signal indicates that the reagent storage compartment has been removed from the housing and reinserted into the housing. As an example, the at least one optional part of the control unit integrated into the reagent storage compartment may be configured for performing at least one internal automatic teaching procedure configured for reducing inaccuracies induced by possible manufacturing tolerances of one or more of the components of the reagent storage compartment.

As outlined above, the safety indicator specifically may at least partially be mechanically operable, without the necessity of providing electrical power to the safety indicator. Specifically, the safety indicator may be configured for being brought from the at least one armed state into the at least one disarmed state without the necessity of providing electrical power to the safety indicator, such as by purely mechanical action. Thus, specifically, the safety indicator may comprise at least one movable indicator element. The movable indicator element may be configured for being brought into at least one armed position and into at least one disarmed position. Thus, when the movable indicator element is in the armed position, the safety indicator may also be in the armed position, and when the movable indicator element is in the disarmed position, the safety indicator is in the disarmed position. Therefore, in the following, it is not distinguished between the armed position of the safety indicator and the armed position of the movable indicator element, and between the disarmed position of the safety indicator and the disarmed position of the movable indicator element. Similarly, when the safety indicator is in the armed state, the movable indicator element may be in the armed position and, thus, may be in an armed state, and when the safety indicator is in the disarmed state, the movable indicator element may be in the disarmed position and, thus, may be in a disarmed state.

The laboratory instrument, specifically a safety device of the laboratory instrument, as outlined above, further may comprise the at least one readout unit. The readout unit may be configured for detecting whether the movable indicator element is in the armed position or in the disarmed position, and specifically for providing at least one readout signal, such as the readout signal as discussed above, indicating whether the reagent storage compartment has been removed from the housing and reinserted into the housing. Specifically, in a reset process, the movable indicator element may be brought into the armed position. The safety indicator and the readout unit may be components of a safety device. The safety device, besides the safety indicator and the optional readout unit, may further optionally comprise one or more actuators, such as at least one compartment actuator and/or at least one indicator actuator, as will be outlined in further detail below.

The term "movable indicator element" as used herein is a broad term and is to be given its ordinary and customary meaning to a person of ordinary skill in the art and is not to be limited to a special or customized meaning. The term specifically may refer, without limitation, to an arbitrary element or a combination of elements which are movable in at least one dimension, such as at least one of slidable, pivotable and rotatable, wherein a position of the element may be detected and may, thus, provide at least one item of information. The at least one item of information, thus, may be position-encoded in the position of the indicator element. The term "position" as used herein is a broad term and is to be given its ordinary and customary meaning to a person of ordinary skill in the art and is not to be limited to a special or customized meaning. The term specifically may refer, without limitation, to an arbitrary spatial configuration of an element, such as at least one configuration selected from the group consisting of an absolute position in space, a relative position with respect to at least one other element, an absolute orientation in space, a relative orientation with respect to at least one other element.

The term "armed position" as used herein is a broad term and is to be given its ordinary and customary meaning to a person of ordinary skill in the art and is not to be limited to a special or customized meaning. The term specifically may refer, without limitation, to an arbitrary position in the above-mentioned sense which is predefined or definable as a reference position indicating that the reagent storage compartment has not been removed from the housing, e.g. during a power failure, during a predefined time period, since the most recent reset or since the most recent automatic teaching procedure. Thus, the armed position may define a position in which the laboratory instrument is operable with the reagent storage compartment inserted in the housing.

Similarly, the term "disarmed position" as used herein also is a broad term and is to be given its ordinary and customary meaning to a person of ordinary skill in the art and is not to be limited to a special or customized meaning. The term specifically may refer, without limitation, to an arbitrary position different from the armed position, which is predefined or definable as a position indicating that the reagent storage compartment has been removed from the housing, e.g. during a power failure, during a predefined time period, since the most recent reset or since the most recent automatic teaching procedure. The disarmed position may, thus, generally define a position in which the laboratory instrument is not operable without any further steps, such as the above-mentioned automatic teaching procedure, and/or a position indicating that further action is required before the laboratory instrument may be used with the reagent storage container.

The term "readout unit" as used herein also is a broad term and is to be given its ordinary and customary meaning to a person of ordinary skill in the art and is not to be limited to a special or customized meaning. The term specifically may refer, without limitation, to an arbitrary device or an arbitrary combination of devices configured for detecting the position of the movable indicator element, specifically for distinguishing between the at least one armed position and the at least one disarmed position. Therein, various types of detectors may be used, as the skilled person will recognize. Thus, as an example, at least one of an electronic, a magnetic and an optical detector, may be used. As will be outlined in further detail below, specifically at least one light switch may be used, such as a light switch having a light barrier. Other detector principles, however, are feasible. The readout unit specifically may be configured for providing at least one readout signal, which, as an example, may be retrieved by the control unit. For possible examples of the readout signal, which may directly or indirectly, e.g. after an intermediate storage in at least one data storage device, be transmitted or provided to the control unit, reference may be made to the description given above. The readout signal, as an example, may be or may comprise at least one analogue signal and/or digital signal. As an example, the readout signal simply may be or may comprise a binary signal providing information on whether the movable indicator element is in the armed position or in the disarmed position.

The laboratory instrument may further comprise at least one compartment actuator. The compartment actuator may be configured for bringing the movable indicator element from the armed position into the disarmed position when the reagent storage compartment is removed from the housing. Thus, the compartment actuator specifically may be configured for performing the above-mentioned action of coupling the removal and/or the reinsertion of the reagent storage compartment to the alteration of the state of the safety indicator, thereby automatically altering the detectable state of the safety indicator during the process of removing the reagent storage compartment from the housing and reinserting the reagent storage compartment into the housing. The term "compartment actuator" as used herein also is a broad term and is to be given its ordinary and customary meaning to a person of ordinary skill in the art and is not to be limited to a special or customized meaning. The term specifically may refer, without limitation, to an arbitrary actuator, specifically a mechanical actuator, which is configured for performing the indicated action, i.e. for directly or indirectly acting on the movable indicator element when the reagent storage compartment is removed from the housing. As an example, the compartment actuator may be or may comprise at least one lever, e.g. a lever which is directly or indirectly mechanically connected to the reagent storage compartment and/or integrated into the reagent storage compartment and which, during the movement of the reagent storage compartment, acts on the movable indicator element. Thus, a force, e.g. a mechanical force, which is exerted onto the reagent storage compartment during removal of the reagent storage compartment from the housing, may be transferred, by the compartment actuator, onto the movable indicator element.

The compartment actuator specifically may further be configured for leaving the movable indicator element in the disarmed position when the reagent storage compartment is reinserted into the housing. As an example, in the armed position, the movable indicator element may be in a position in which the compartment actuator, during removal of the reagent storage compartment from the housing, acts on to the movable indicator element, thereby bringing the movable indicator element into the disarmed position. During a reverse movement and, thus, during the reinsertion of the reagent storage compartment into the housing, however, the indicator element, now being in the disarmed position, may be out of reach of the compartment actuator, such that the compartment actuator does not act upon the indicator element and does not bring the indicator element back from the disarmed position into the armed position. This configuration, as will be outlined in further detail below, may be achieved by an appropriate mechanical design of the movable indicator element. As will be shown, this function specifically may be provided when the movable indicator element is fully or partially designed as a rotatable indicator element, wherein, during movement from the armed position into the disarmed position, the rotatable indicator element may be rotated out of reach of the compartment actuator. Similar configurations, however, are also feasible, e.g. for linear movable indicator elements, e.g. by sliding the indicator element out of reach of the compartment actuator. Generally, however, the laboratory instrument may be designed such that the movable indicator element, in conjunction with the compartment actuator, is designed such that the movable indicator element is moved from the armed position into the disarmed position by removal and reinsertion of the reagent storage compartment, thereby providing indication that the reagent storage compartment has been removed and reinserted, e.g. even during a power outage.

As outlined above, the compartment actuator specifically may be a mechanical compartment actuator mechanically acting on the movable indicator element. Thus, specifically, the compartment actuator may be purely mechanical, without the necessity of providing electric energy to the compartment actuator and/or without mechanical interaction between the compartment actuator and the movable indicator element. It shall be noted, however, that other actions are also feasible, such as magnetic actions, e.g. by providing a permanent magnet on the compartment actuator, acting on the movable indicator element. Specifically, however, the compartment actuator may be designed not to require electric power, for acting upon the movable indicator element.

The laboratory instrument may further comprise at least one indicator actuator. The indicator actuator may be configured for bringing the movable indicator element into the armed position, e.g. during a reset process. Thus, the term "indicator actuator" as used herein also is a broad term and is to be given its ordinary and customary meaning to a person of ordinary skill in the art and is not to be limited to a special or customized meaning. The term specifically may refer, without limitation, to an arbitrary actuator which is configured for performing the indicated action, i.e. for directly or indirectly acting on the movable indicator element, in order to bring the indicator actuator back into the armed position. Thus, the indicator actuator also may be referred to as a "reset actuator", since the indicator actuator may specifically be in action during a reset process in which the movable indicator element is brought back from the disarmed position into the armed position. The reset actuator specifically may be different and/or separated from the compartment actuator. Specifically, the indicator actuator may be an actuator which is configured for bringing back the movable indicator element from a disarmed position into the armed position independent from any movement of the reagent storage compartment. Specifically, the indicator actuator may be configured for not being actuated and for not automatically bringing back the movable indicator element from a disarmed position into the armed position when the reagent storage compartment is reinserted into the housing. The indicator actuator, as an example, may be electrically controlled, e.g. by the control unit. Thus, as an example, in the above-mentioned reset process, the control unit may be configured for sending a control signal to the indicator actuator in order to trigger the indicator actuator to bring the movable indicator element back from the disarmed position into the armed position.

Thus, specifically and generally, the indicator actuator may comprise at least one actuator, which may be triggered by the control unit. Thus, as an example, the control unit may be configured for performing at least one automatic teaching procedure, and, e.g. when the automatic teaching procedure is completed, for triggering the indicator actuator in order to reset the movable indicator element, thereby bringing the movable indicator element back from the disarmed position into the armed position, indicating e.g. that the laboratory instrument may properly operate with the reagent storage compartment. Specifically, the indicator actuator may comprise at least one electric actuator, such as at least one electric motor, specifically at least one stepper motor. Other actuators, however, are also feasible, such as other actuators which may be controlled by the control unit. The indicator actuator specifically may be separate from the compartment actuator.

As outlined above, the laboratory instrument specifically may be configured for mechanically bringing the movable indicator element from the armed position into the disarmed position when the reagent storage compartment is removed from the housing, e.g. by using the compartment actuator. The laboratory instrument may further be configured for leaving the movable indicator element in the disarmed position when the reagent storage compartment is reinserted into the housing. Further, the laboratory instrument may be configured for performing at least one automatic teaching procedure when the movable indicator element is detected to be in the disarmed position, such as triggered by the control unit. The laboratory instrument may further be configured for bringing the movable indicator element back into the armed position, specifically when the automatic teaching procedure is completed, e.g. by using the indicator actuator, specifically being triggered by the control unit.

As outlined above, various ways of designing the movable indicator element exist. Specifically, the movable indicator element may be or may comprise at least one mechanically movable indicator element, such as at least one slidable and/or at least one rotatable indicator element. The movable indicator element, as an example, may comprise at least one lever and/or at least one cam which may be acted upon during removal of the reagent storage compartment, thereby bringing the movable indicator element from the armed position into the disarmed position. The lever and/or cam, on the other hand, may not be acted upon during reinsertion of the reagent storage compartment into the housing, thereby leaving the movable indicator element in the disarmed position during reinsertion of the reagent storage compartment into the housing.

Thus, specifically, the movable indicator element may comprise at least one rotatable movable indicator element. As an example, the rotatable movable indicator element may comprise a wheel disposed on an axle, the wheel, as an example, having one or more cams on its circumferential surface, wherein an action on to the one or more cams may course, the wheel, to rotate about the axle. Generally, the movable indicator element may comprise at least one rotatable movable indicator element, and the armed position and the disarmed position specifically may be different rotational positions or angular positions of the rotatable movable indicator element. As an example, the armed position may be or may comprise at least one first angular position of the rotatable movable indicator element, and the at least one disarmed position may be or may comprise at least one second angular position of the rotatable movable indicator element, the second angular position being different from the first angular position.

As further outlined above, the rotatable movable indicator element specifically may comprise at least one toothed wheel having at least one tooth, also referred to as at least one cam. Thus, the term "toothed wheel" as used herein also is a broad term and is to be given its ordinary and customary meaning to a person of ordinary skill in the art and is not to be limited to a special or customized meaning. The term specifically may refer, without limitation, to a wheel having a circumferential surface with at least one tooth or cam, specifically with a plurality of teeth or cams. As an example, the toothed wheel may comprise one, two, three or even more teeth or cams. One or more of the teeth or cams of the toothed wheel, as an example, may interact with the compartment actuator, as outlined above. Thus, as an example, the compartment actuator may exert a torque onto the toothed wheel via the at least one tooth or cam when the reagent storage compartment is removed from the housing. In order to avoid an interaction of the compartment actuator with more than one tooth and/or in order to avoid an interaction of the compartment actuator with any one of the teeth when the reagent storage compartment is reinserted into the housing, the toothed wheel may have a low number of teeth or cams, such as no more than four teeth or even no more than three teeth.

Thus, generally, the reagent storage compartment may be configured to mechanically act upon the at least one tooth of the toothed wheel, or on at least one of a plurality of teeth of the toothed wheel, specifically by the at least one compartment actuator, when the reagent storage compartment is removed from the housing. The reagent storage compartment further may be configured not to act upon the tooth of the toothed wheel when the reagent storage compartment is reinserted into the housing. As discussed above, this may be implemented, as an example, by a configuration in which the at least one tooth or cam is rotated out of reach of the compartment actuator when the rotatable movable indicator element is in the disarmed position, such that the rotatable movable indicator element remains in the disarmed position when the reagent storage compartment is reinserted into the housing.

Besides the purpose of being acted upon during removal of the reagent storage compartment from the housing, e.g.

via the compartment actuator, for the purpose of bringing the rotatable movable indicator element from the armed position into the disarmed position during removal of the reagent storage compartment from the housing, the one or more teeth or cams of the toothed wheel may also fulfill one or more other purposes. As an example, at least one of the one or more teeth or cams of the toothed wheel may fulfill indicating purposes and/or the purposes of being detected by the readout unit. Thus, as an example, the toothed wheel may comprise at least two teeth having different purposes. as an example, a first tooth, also being referred to as an "actuator tooth", may be configured for being mechanically acted upon, directly or indirectly, by the reagent storage compartment, specifically when the reagent storage compartment is removed from the housing. At least one second tooth, also being referred to as a "readout tooth", may be provided for detecting purposes, in order to detect the position of the rotatable movable indicator element, e.g., to detect whether the rotatable movable indicator element is in the armed position or not. For this purpose, the readout unit may be configured for detecting the readout tooth of the teeth. As an example, the readout unit may be configured for detecting if the readout tooth is in a specific position or not, e.g. in a position indicating that the rotatable movable indicator element is in the armed position or not. As discussed above, this may be performed by various detection techniques. Specifically, the readout unit may comprise at least one light switch. The readout unit may be configured to detect whether the readout tooth is positioned between an emitter and a detector of the light switch. The function of the teeth may also change over time and/or with the removal and reinsertion processes. Thus, as an example, the rotatable movable indicator element may continuously rotate into one direction, such that the teeth, sequentially, take the function of the readout tooth and the actuator tooth.

As further outlined above, various types of reagent storage compartments are generally feasible. Specifically, the reagent storage compartment may comprise a drawer. The drawer specifically may be accommodated in a drawer compartment of the housing. Additionally or alternatively, however, the reagent storage compartment may also comprise other types of compartments which are attachable and/or insertable into the housing. As an example, the housing may comprise one or more connecting elements for reversibly connecting the reagent storage compartment to the housing, wherein the reagent storage compartment may be detached from the housing, e.g. for the purpose of refilling and/or for safeguarding the contents of the reagent storage compartment. Consequently, the term "insert" has to be interpreted in a broad sense, indicating that, in an "inserted" state, the reagent storage compartment fully or partially disposed inside the housing and/or is attached to the housing in a way that the laboratory instrument may properly make use of the contents of the reagent storage compartment.

Specifically, the laboratory instrument may comprise at least one guiding mechanism configured for guiding a removal of the reagent storage compartment from the housing and/or for guiding a reinsertion of the reagent storage compartment into the housing. Specifically, the reagent storage compartment may comprise a drawer, as discussed above. Thus, the guiding mechanism specifically may comprise at least one guide rail enabling a sliding movement of the drawer. The safety indicator may fully or partially be integrated into the guiding mechanism. Other options, however, are also feasible.

In a further aspect of the present invention, a method of operating the laboratory instrument as disclosed herein, such as according to any one of the embodiments described above and/or according to any one of the embodiments described in further detail below, is proposed. The method comprises the method steps described in detail below. These method steps may specifically be performed in the given order. However, generally, a different order may also be feasible. Further, one or more or even all of the method steps may be performed once or repeatedly. The method may further comprise additional method steps which are not listed herein.

The method comprises:

i. receiving at least one readout signal from the safety indicator;
ii. checking if the readout signal indicates that the reagent storage compartment has been removed from the housing;
iii. depending on the result of step ii., performing at least one automatic teaching procedure of the laboratory instrument.

Thus, as discussed above, the automatic teaching procedure may be performed if the result of step ii. indicates that the reagent storage compartment has been removed from the housing, e.g. since the most recent reset of the laboratory instrument, during which the movable indicator element was brought into the armed position. Specifically, the automatic teaching procedure may be performed after the laboratory instrument was in an unpowered state, e.g. if the result of step ii. indicates that the reagent storage compartment has been removed from the housing during the time period of the unpowered state. However, if the result of step ii. indicates that the reagent storage compartment has not been removed from the housing, e.g. since the most recent reset of the laboratory instrument, during which the movable indicator element was brought into the armed position, the teaching procedure may not be performed.

Subsequent to performing steps i.-iii., sample processing of the at least one sample by the laboratory instrument may be performed. Method steps i.-iii. may be performed at various points in time. Specifically, the method may be performed in regular time intervals, and/or at predetermined points in time. Additionally or alternatively, steps i.-iii. may be performed whenever the laboratory instrument is powered on.

The method specifically may fully or partially be computer-implemented. thus, as an example, the above-mentioned control unit of the laboratory instrument may perform an/or initiate the method automatically, e.g. at predetermined points in time, such as in regular time intervals, and/or triggered by a specific events, such as a powering of the laboratory instrument.

Consequently, in a further aspect of the present invention, a computer program is proposed, comprising instructions which, when the program is executed by the laboratory instrument as described herein, such as according to any one of the embodiments described above and/or according to any one of the embodiments described in further detail below, specifically by the control unit of the laboratory instrument, cause the laboratory instrument to perform the method as described herein, such as according to any one of the embodiments described above and/or according to any one of the embodiments described in further detail below. Similarly, in a further aspect of the invention, a computer-readable storage medium is disclosed, comprising instructions which, when the instructions are executed by the laboratory instrument as described herein, such as according to any one of the embodiments described above and/or according to any one of the embodiments described in further detail below, specifically by the control unit of the laboratory instrument, cause the laboratory instrument to perform the method as described herein, such as according to any one of the embodiments described above and/or according to any one of the embodiments described in further detail below.

As used herein, the term "computer-readable storage medium" specifically may refer to a non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

As outlined above, one, more than one or even all of method steps i. to iii. may be performed by using a computer or a computer network, preferably by using a computer program. Specifically, the method steps may be computer-implemented on the control unit of the laboratory instrument.

Further disclosed and proposed herein is a computer program product having program code means, in order to perform the method according to the present invention in one or more of the embodiments enclosed herein when the program is executed on a computer or computer network. Specifically, the program code means may be stored on a computer-readable data carrier and/or on a computer-readable storage medium. Further disclosed and proposed herein is a data carrier having a data structure stored thereon, which, after loading into a computer or computer network, such as into a working memory or main memory of the computer or computer network, may execute the method according to one or more of the embodiments disclosed herein. Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network. Finally, disclosed and proposed herein is a modulated data signal which contains instructions readable by a computer system or computer network, for performing the method according to one or more of the embodiments disclosed herein.

The laboratory instrument, the method, the computer program and the computer-readable storage medium as proposed herein provide a large number of advantages over known devices and methods of similar kind. Specifically, the above-mentioned technical challenges may effectively be addressed.

Specifically, the reagent storage compartment may comprise or accommodate one or more cassettes and/or other vessels for storing and/or providing one or more reagents to the laboratory instrument and/or to the at least one sample processing device of the laboratory instrument. Thus, as an example, commercially available laboratory instruments, such as laboratory instruments of the Roche Cobas® series, comprise reagent storage compartments, often also referred to as a "Reagent Supply Unit" (RSU). Due to the typically high economic value and the oftentimes elevated number of reagent cassettes, such as more than five, more than 10 or even 15 or more reagent cassettes, the RSU can typically accommodate, the laboratory instrument typically has to allow for an easy retrieval of the contents of the reagent storage compartment, such as of the reagent cassettes, specifically in case of a power failure or even breakdown.

For this purpose, as outlined above, the reagent storage compartment is reversibly removable from the housing, specifically also in an unpowered state of the laboratory instrument. Thus, specifically, a complete retrieval of the reagents, such as the reagent cassettes, stored in the reagent storage compartment may be possible, specifically even in an unpowered state. As an example, the reagent storage compartment may be removed from the housing by means of a sliding mechanism that may allow for a complete extraction of the reagent storage compartment, such as the RSU, specifically without the need of tools. thus, specifically, the at least one reagent storage compartment may be reversibly removable from the housing manually and/or without the need of specific tools.

When the reagent storage compartment, such as the RSU, is outside the housing, the user may typically easily access the reagents stored therein, such as all reagent cassettes located in storing and pipetting positions inside the reagent storage compartment, e.g. by removing an insulation cover panel and a window cover.

However, the invention in one or more of the above-mentioned embodiments also addresses the issue that, specifically whenever the reagent storage compartment has been removed from the laboratory instrument and reinserted into the laboratory instrument, such as slid back into the housing, it is typically required to perform the automatic teaching procedure. Otherwise, as discussed above, physical damage may occur or a processing run might fail. As an example, without automatic teaching procedure, a pipetting system having one or more needles might collide with one or more of the contents of the reagent storage compartment, thereby damaging, as an example, a needle of the pipetting system.

By using the laboratory instrument as described herein, a setup may be provided which may be capable of detecting and/or indicating if the reagent storage compartment has been removed from the housing and reinserted into the housing, specifically even if the laboratory instrument was powered off. The mechanism, specifically the electronically readable safety indicator, may be configured such that the safety indicator indicates whether the reagent storage compartment has been removed from the housing and reinserted into the housing, independent from any electrical power supply to the laboratory instrument during the removal and/or reinsertion of the reagent storage compartment. Thus, specifically, the safety indicator may be a mechanical safety indicator, which, despite of the fact that a readout may take place by using electricity in a powered state, may change its state, specifically its position, e.g. from the armed position into the disarmed position, during removal of the reagent storage compartment by purely mechanical means, without the need of the laboratory instrument being powered. The disarmed position being established that way may be stored in the safety indicator, e.g. encoded in its state or position, for readout at a later stage, e.g. a readout in a powered state of the laboratory instrument. The safety indicator itself may not comprise or require any battery or any other energy storage device for storing the disarmed state of the safety indicator. Thus, the laboratory instrument generally may comprise at least one safety device, the safety device comprising the safety indicator and the readout unit, e.g. according to any one of the embodiments described above and/or according to any one of the embodiments described in further detail below, wherein at least the safety indicator may be a purely mechanical safety indicator which does not require any electrical energy supply.

The safety device, comprising the safety indicator and the optional readout unit, may be easily implemented by using, as an example, the rotatable movable indicator element, specifically with the toothed wheel, and an appropriate detector for detecting an angular position of the toothed wheel, such as a light switch. Further, as also outlined above, actuators may be provided, such as the at least one compartment actuator, which may also be referred to as a "teeth actuator", and the at least one optional indicator actuator or reset actuator. As an example, the setup may be accomplished by a rotor with two, three or four teeth, an appropriate teeth actuator like, e.g., a lever attached to the reagent storage compartment, a reset actuator like e.g. a stepper motor, and a light switch, such as a light barrier, configured to act as an appropriate detector and, thus, as part of the readout unit.

Further, the laboratory instrument may be configured for performing a reset procedure, specifically after an automatic teaching procedure has been completed. The reset procedure may, as discussed above, imply bringing back the movable indicator element, such as the rotatable movable indicator element, from the disarmed position into the armed position, thereby, as an example, indicating to the control unit that the reagent storage compartment may be accessible for processing. As an example, when the reagent storage compartment is reinserted into the laboratory instrument and the automatic teaching procedure has been completed, the stepper motor may rotate the rotor, e.g. the rotor with the three teeth, until the readout unit, e.g., the detector of the readout unit, and, more specifically, the light barrier, detects one of the teeth. This position, specifically, may be the armed position. Thus, specifically, the detector of the readout unit may be configured for detecting one or more of the teeth in the armed position. It shall be noted, however, that other detection means are feasible as well, such as one or more detectors detecting the at least one tooth in at least one other position than the armed position, e.g. the at least one disarmed position.

The state of the safety indicator may be read out, e.g. by the readout unit, at one or more predetermined points in time and/or whenever one or more predetermined conditions are fulfilled. Thus, as an example, every time the laboratory instrument is restarted, the state of the safety indicator may be read out, e.g. by checking the status of the light switch, as discussed above, e.g., the light barrier. Depending on the result of this check, the laboratory instrument may determine whether the reagent storage compartment has been removed from the housing and reinserted into the housing, e.g. during a power outage or switch-off period of the laboratory instrument. As an example, if one of the teeth of the rotor is detected, the laboratory instrument may conclude that the reagent storage compartment has not been removed from the housing, and the laboratory instrument generally does not need to perform the automatic teaching procedure. Generally, the laboratory instrument may be configured to determine that no need for an automatic teaching procedure exists as long as the electronically readable safety indicator is detected to be in the armed position. On the other hand, the laboratory instrument may be configured to determine that an automatic teaching procedure is required when the electronically readable safety indicator is detected to be in the disarmed position.

In the specific example using the movable indicator element, specifically the rotatable movable indicator element such as the rotor having the toothed wheel, when the reagent storage compartment is removed from the housing, e.g., when the RSU is extracted from the housing, the teeth actuator may move along with the reagent storage compartment, and may move the movable indicator element, such as the rotor, out of position, e.g. from the armed position into the disarmed position. In this case, the detector may detect the move of the movable indicator element, such as by detecting that a specific tooth is not located in the light path of the light switch any longer. This position, as discussed above, may also be called the at least one disarmed position.

Furthermore, when the reagent storage compartment is reinserted into the housing, the movable indicator element, specifically the rotatable movable indicator element such as the rotor having the toothed wheel, may remain unaffected by this reinsertion. As an example, when the RSU is pushed back into the housing, the teeth actuator may not act upon the movable indicator element, such as by not colliding with the rotor and/or with any of the teeth of the rotor. Thus, the position of the movable indicator element remains unchanged by the reinsertion, e.g. by leaving the movable indicator element in the disarmed position. as an example, the rotor may not rotate during reinsertion of the reagent storage compartment.

In order to be able to reset the electronically readable safety indicator, e.g. by bringing back the movable indicator element from the disarmed position into the armed position, the at least one indicator actuator or reset actuator may be provided, e.g., the stepper motor. Thus, as an example, the only way of rotating the rotor back into the armed position may be an actuation by the stepper motor, e.g., triggered by the control unit.

The safety indicator may be configured for remaining, as soon as a reset step has been performed, in the armed state, such as the armed position, unless the reagent storage compartment is removed from the housing. When in the disarmed state, specifically in the disarmed position, however, the electronically readable safety indicator may be configured to remain in this disarmed state or position, unless a reset process is performed, e.g., by using the reset actuator.

It shall be noted, that the electronically readable safety indicator may be implemented by various means, in the light of the discussion of possible embodiments given above and/or given in further detail below. Any combination of any basic mechanical/electronic components having similar functionality as described above can be used create a similar mechanism, such as by using other types of actuators and/or detectors, e.g., other types of motors and/or magnetic actuators, and/or different types of detectors, such as mechanical switches, styluses or the like.

Summarizing and without excluding further possible embodiments, the following embodiments may be envisaged:

Embodiment 1 A laboratory instrument for processing at least one sample, the laboratory instrument comprising:

a. at least one housing having at least one sample processing device disposed therein;
b. at least one reagent storage compartment reversibly removable from the housing, and
c. at least one safety indicator, the safety indicator being configured for indicating if the reagent storage compartment has been removed from the housing and reinserted into the housing, wherein the laboratory instrument is configured for automatically altering a detectable state of the safety indicator during the process of removing and reinserting the reagent storage compartment.

Embodiment 2 The laboratory instrument according to the preceding embodiment, wherein the laboratory instrument is electrically operable in a powered state, wherein the reagent storage compartment is reversibly removable from the housing in an unpowered state, wherein the safety indicator is configured for indicating if the reagent storage compartment has been removed from the housing and reinserted into the housing during a period in which the laboratory instrument was unpowered.

Embodiment 3 The laboratory instrument according to any one of the preceding embodiments, wherein the laboratory instrument comprises at least one control unit configured for receiving and evaluating at least one readout signal indicating a state of the safety indicator.

Embodiment 4 The laboratory instrument according to the preceding embodiment, wherein the control unit is configured for performing at least one automatic teaching procedure when the readout signal indicates that the reagent storage compartment has been removed from the housing and reinserted into the housing.

Embodiment 5 The laboratory instrument according to any one of the preceding embodiments, wherein the safety indicator comprises at least one movable indicator element, the movable indicator element being configured for being brought into at least one armed position and into at least one disarmed position, wherein the laboratory instrument further comprises at least one readout unit for detecting whether the movable indicator element is in the armed position or in the disarmed position, and specifically for providing at least one readout signal.

Embodiment 6 The laboratory instrument according to the preceding embodiment, wherein the laboratory instrument further comprises at least one compartment actuator, wherein the compartment actuator is configured for bringing the movable indicator element from the armed position into the disarmed position when the reagent storage compartment is removed from the housing.

Embodiment 7 The laboratory instrument according to the preceding embodiment, wherein the compartment actuator is further configured for leaving the movable indicator element in the disarmed position when the reagent storage compartment is reinserted into the housing.

Embodiment 8 The laboratory instrument according to any one of the two preceding embodiments, wherein the compartment actuator is a mechanical compartment actuator mechanically acting on the movable indicator element.

Embodiment 9 The laboratory instrument according to any one of the four preceding embodiments, wherein the laboratory instrument further comprises at least one indicator actuator, wherein the indicator actuator is configured for bringing the movable indicator element into the armed position.

Embodiment 10 The laboratory instrument according to the preceding embodiment, wherein the indicator actuator comprises at least one electric motor, specifically at least one stepper motor.

Embodiment 11 The laboratory instrument according to any one of the six preceding embodiments, wherein the laboratory instrument is configured for mechanically bringing the movable indicator element from the armed position into the disarmed position when the reagent storage compartment is removed from the housing, wherein the laboratory instrument is further configured for leaving the movable indicator element in the disarmed position when the reagent storage compartment is reinserted into the housing, wherein the laboratory instrument is further configured for performing at least one automatic teaching procedure when the movable indicator element is detected to be in the disarmed position and further is configured for bringing the movable indicator element back into the armed position, specifically when the automatic teaching procedure is completed.

Embodiment 12 The laboratory instrument according to any one of the seven preceding embodiments, wherein the movable indicator element comprises at least one rotatable movable indicator element, wherein the armed position and the disarmed position are different rotational positions of the rotatable movable indicator element.

Embodiment 13 The laboratory instrument according to the preceding embodiment, wherein the rotatable movable indicator element comprises at least one toothed wheel having at least one tooth, wherein the reagent storage compartment is configured to mechanically act upon the tooth of the toothed wheel, specifically by at least one compartment actuator, when the reagent storage compartment is removed from the housing.

Embodiment 14 The laboratory instrument according to the preceding embodiment, wherein the reagent storage compartment further is configured not to act upon the tooth of the toothed wheel when the reagent storage compartment is reinserted into the housing.

Embodiment 15 The laboratory instrument according to any one of the two preceding embodiments, wherein the toothed wheel comprises at least two teeth, wherein the reagent storage compartment is configured to mechanically act upon at least a first tooth of the teeth, specifically on at least one actuator tooth, wherein the readout unit further is configured for detecting at least a second tooth of the teeth, specifically at least one detector tooth or indicator tooth.

Embodiment 16 The laboratory instrument according to the preceding embodiment, wherein the readout unit comprises at least one light switch, wherein the readout unit is configured to detect whether the readout tooth is positioned between an emitter and a detector of the light switch.

Embodiment 17 The laboratory instrument according to any one of the preceding embodiments, wherein the reagent storage compartment comprises a drawer.

Embodiment 18 A method of operating the laboratory instrument according to any one of the preceding embodiments, the method comprising:

i. receiving at least one readout signal from the safety indicator;
ii. checking if the readout signal indicates that the reagent storage compartment has been removed from the housing;
iii. depending on the result of step ii., performing at least one automatic teaching procedure of the laboratory instrument.

Embodiment 19 The method according to the preceding embodiment, wherein steps i.-iii. are performed whenever the laboratory instrument is powered on.

Embodiment 20 The method according to any one of the preceding method embodiments, wherein the method is computer-implemented.

Embodiment 21 A computer program comprising instructions which, when the program is executed by the laboratory instrument according to any one of the preceding embodiments referring to a laboratory instrument, cause the laboratory instrument to perform the method according to any one of the preceding embodiments referring to a method.

Embodiment 22 A computer-readable storage medium comprising instructions which, when the instructions are executed by the laboratory instrument according to any one of the preceding embodiments referring to a laboratory instrument, cause the laboratory instrument to perform the method according to any one of the preceding embodiments referring to a method.

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

Examples

In FIG. 1, an embodiment of a laboratory instrument 110 is shown in a perspective view. The laboratory instrument 110, as an example, may be embodied as a Roche Cobas® 5800 system. It shall be noted, however, that other embodiments of a laboratory instrument 110 are also feasible.

The laboratory instrument 110 is embodied for processing at least one sample, such as at least one sample of a bodily fluid. For this purpose, the laboratory instrument 110 may comprise at least one sample port 112 for feeding samples and/or sample vessels into a housing 114 of the laboratory instrument 110. Further, inside the housing 114, one or more sample processing devices 116 may be arranged, which are only shown schematically in FIG. 1. As an example, one or more pipetting devices and/or one or more sample handling devices may be provided.

Figure 2A:
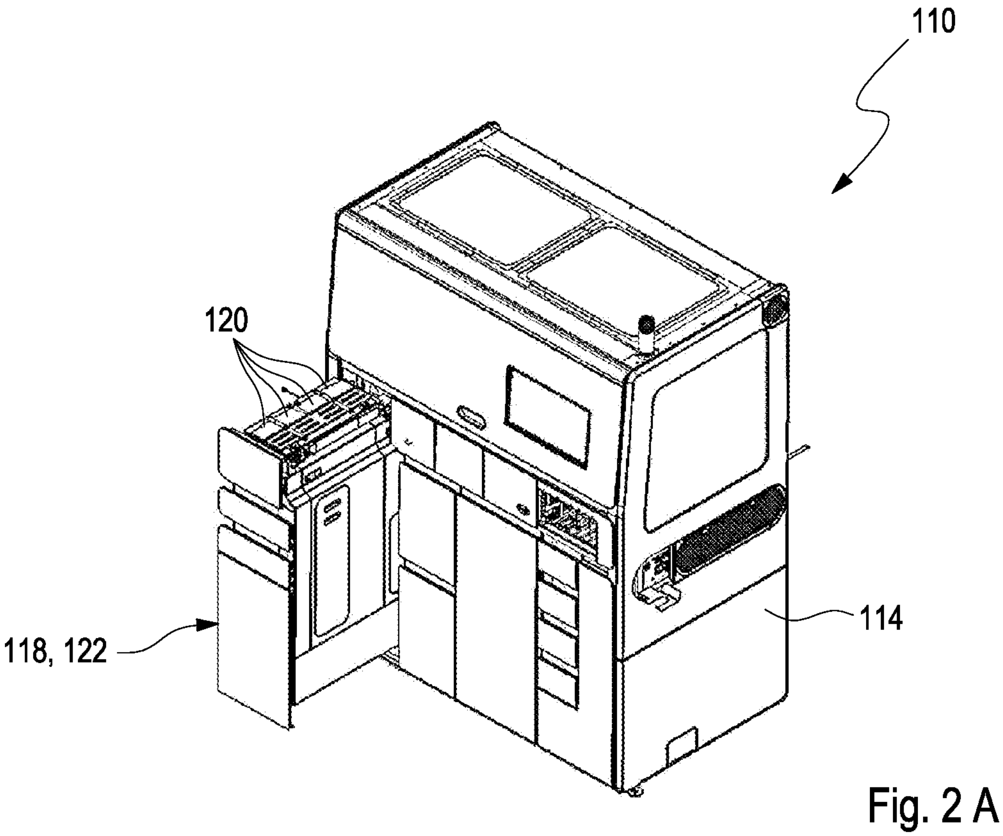
FIGS. 2A and 2B show different steps of an embodiment of removing a reagent storage compartment from the housing of the laboratory instrument according to FIG. 1.
Figure 2B:
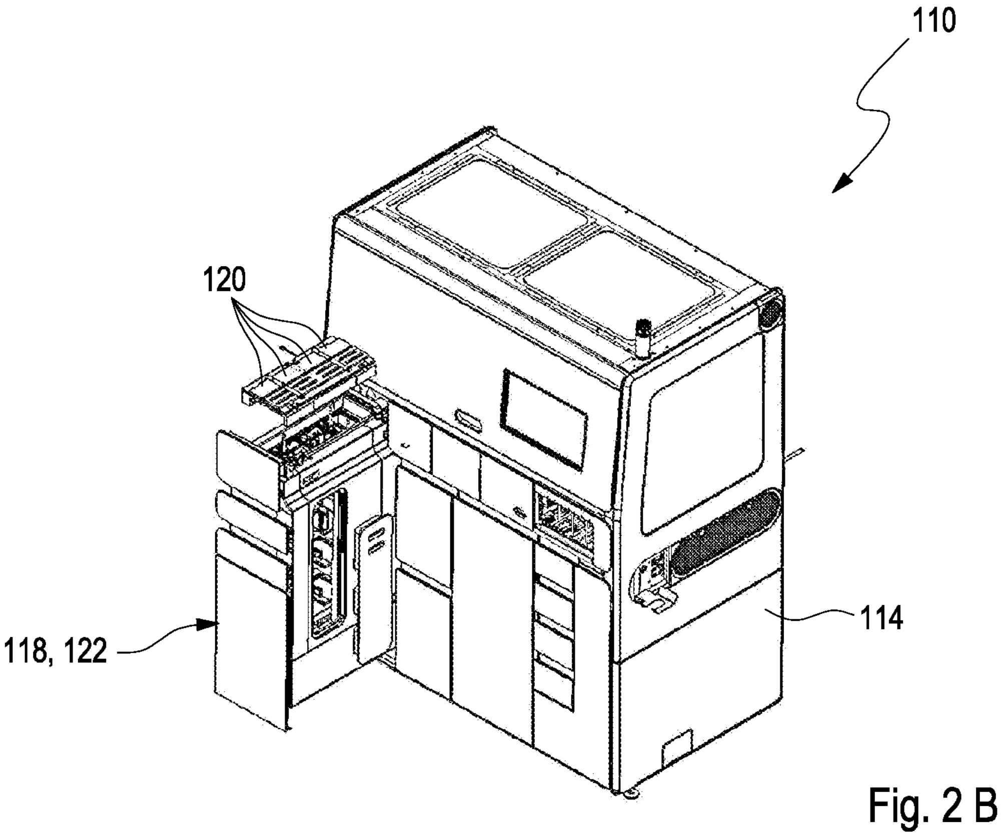

The laboratory instrument 110, further comprises at least one reagent storage compartment 118. The reagent storage compartment 118 may be configured for accommodating one or more reagents used during the processing of the at least one sample by the laboratory instrument 110. The reagent storage compartment 118 has at least two positions. Firstly, as shown in FIG. 1, the reagent storage compartment 118 may be in a position in which the reagent storage compartment 118 is inserted into the housing 114. Generally, the inserted position may be a position in which the reagent storage compartment 118 may provide one or more of the reagents contained therein to the at least one laboratory instrument 110, such as to the one or more sample processing devices 116. Secondly, as shown in FIGS. 2A and 2B, the reagent storage compartment 118 may be brought into at least one removed position, in which the reagent storage compartment 118 is fully or partially removed from the housing 114. In this removed position, the reagent storage compartment 118 may not provide reagents to the laboratory instrument 110 and/or to the sample processing device 116. Instead, as shown e.g. in FIG. 2B, one or more reagents or reagent containers 120, such as reagent cassettes, may be removed from the reagent storage compartment 118.

In the exemplary embodiment shown in FIGS. 2A and 2B, the reagent storage compartment 118 is embodied as a drawer 122 which may be pulled out of the housing 114. It shall be noted, however, that other means of inserting and removing the reagent storage compartment 118 are feasible, and/or other means of coupling the reagent storage compartment 118 to the housing 114. Thus, generally, the inserted position may be a position in which the reagent storage compartment 118 can provide reagents to the laboratory instrument 110 and/or to the sample processing device 116, whereas the removed position may be a position in which reagents inside the reagent storage compartment 118 are accessible to a user, e.g. for replacement of one or more of the reagent containers 120 and/or for safeguarding reagent containers 120 during a power outage.

The laboratory instrument 110 may be electrically powered. In order to retrieve reagent containers 120, such as reagent contents, from the laboratory instrument 110 in case of a power failure or even a breakdown, the reagent storage compartment 118, specifically, may be removable from the housing 114 manually, i.e. without the need of electrical power. Thus, as an example, the drawer 122 may be pulled out of the housing 114 even when the laboratory instrument 110 is powered off. The removal of the reagent storage compartment 118 specifically may be possible without the need of any tools. When the drawer 122 is pulled out of the housing 114, even though one end of the drawer 122 may still be located inside the housing 114, the user may easily access the reagent containers 120 located inside the reagent storage compartment 118. As an example, in order to access the reagent containers 120, the user may have to remove at least one insulation cover panel and/or at least one window cover. The reagent containers 120, e.g. the reagent cassettes, may be located inside the reagent storage compartment 118 in one or more storing and/or pipetting positions.

In many laboratory instruments 110, every time the reagent storage compartment 118 is removed from the laboratory instrument 110 or the housing 114, such as by extracting the drawer 122 from the housing 114, and after reinserting the reagent storage compartment 118 into the housing 114, an automatic teaching procedure may be required. During this automatic teaching procedure, the laboratory instrument 110, specifically at least one control unit 124 indicated in FIG. 1, may be trained on the contents of the reagent storage compartment 118 and/or the arrangement of the reagent containers 120 inside the reagent storage compartment 118. During the training process, as an example, the content and/or the configuration of the reagent storage compartment 118 may be detected, such as by one or more detectors and/or sensors, e.g. a camera. As an example, a processing routine and/or a moving routine of the at least one sample processing device 116 may be adapted to the content and/or the configuration of the reagent storage compartment 118. Without this automatic training procedure, a risk of physical damage exists, which might occur and/or a risk of a running failure, e.g., due to a damaged pipetting needle after a needle collision.

However, since the reagent storage compartment 118 specifically may be removed during a power outage of the laboratory instrument 110, there may be a risk that a removal and subsequent reinsertion of the reagent storage compartment 118 takes places unnoticed. In order to overcome this problem, a safety device 126 may be provided, an embodiment of which is schematically shown in FIGS. 3A to 5, which will be explained in further detail below. The safety device 126, as an example, may be accommodated inside the housing 114, e.g. in close proximity to the reagent storage compartment 118, specifically to the drawer 122. Additionally or alternatively, the safety device 126 may also be fully or partially be implemented and/or integrated in the reagent storage compartment 118.

The safety device 126 comprises, in the embodiments shown herein, at least one safety indicator 128 being configured for indicating if the reagent storage compartment 120 has been removed from the housing 114 and reinserted into the housing 114. Further, the laboratory instrument 110, specifically the safety device 126, may comprise at least one readout unit 130. Further, the safety device 126 may comprise at least one compartment actuator 132, also referred to as a "teeth actuator" and at least one indicator actuator 134, also referred to as a "reset actuator". The compartment actuator 132 may be a purely mechanical actuator, such as a lever, which may be directly or indirectly coupled to the reagent storage compartment 118. The indicator actuator 134 on the other hand, may be an electric actuator. The functionality of the actuators 132, 134 will be outlined in further detail below.

The safety indicator 128 may comprise at least one movable indicator element 136. Specifically, the movable indicator element 136 may be brought into at least one armed position, depicted in FIGS. 3A and 3B, and may also be brought into at least one disarmed position, depicted in FIG. 5. More specifically, the movable indicator element 136 may be embodied as a rotatable movable indicator element 138, also referred to as a "rotor". specifically, the rotatable movable indicator element 138 may comprise a toothed wheel 140, the toothed wheel 140 having, as an example, three teeth 142, also referred to as "cams", on its circumferential side. A different number of teeth 142, however, is also feasible.

Figure 3A:
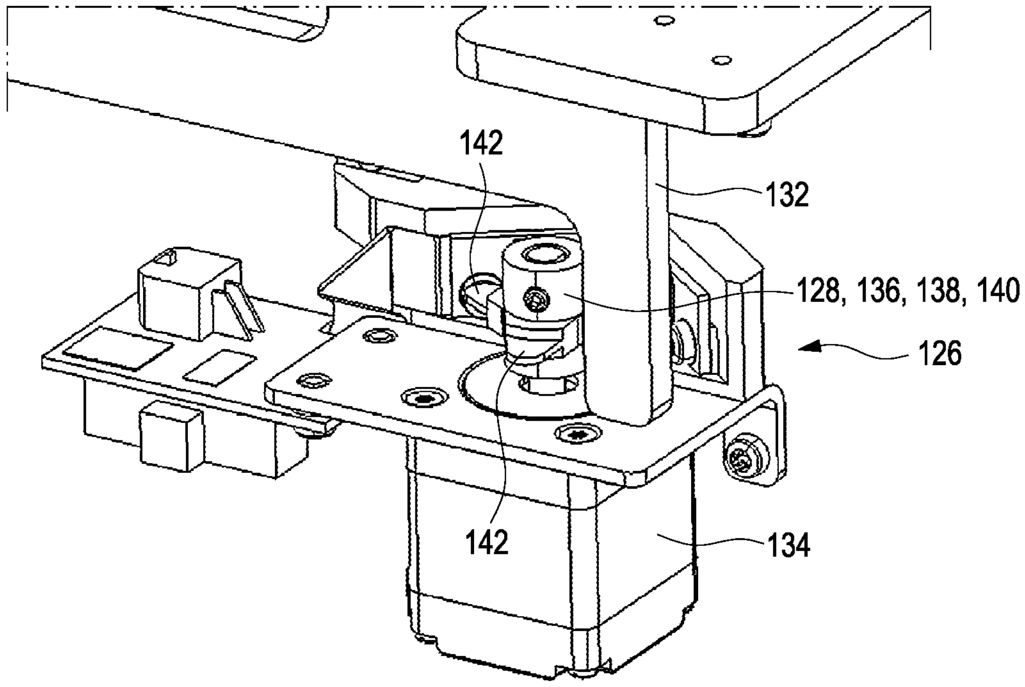
FIGS. 3A and 3B show different views of an embodiment of a safety device of the laboratory instrument according to the preceding figures, the safety device having a safety indicator in an armed state.
Figure 3B:
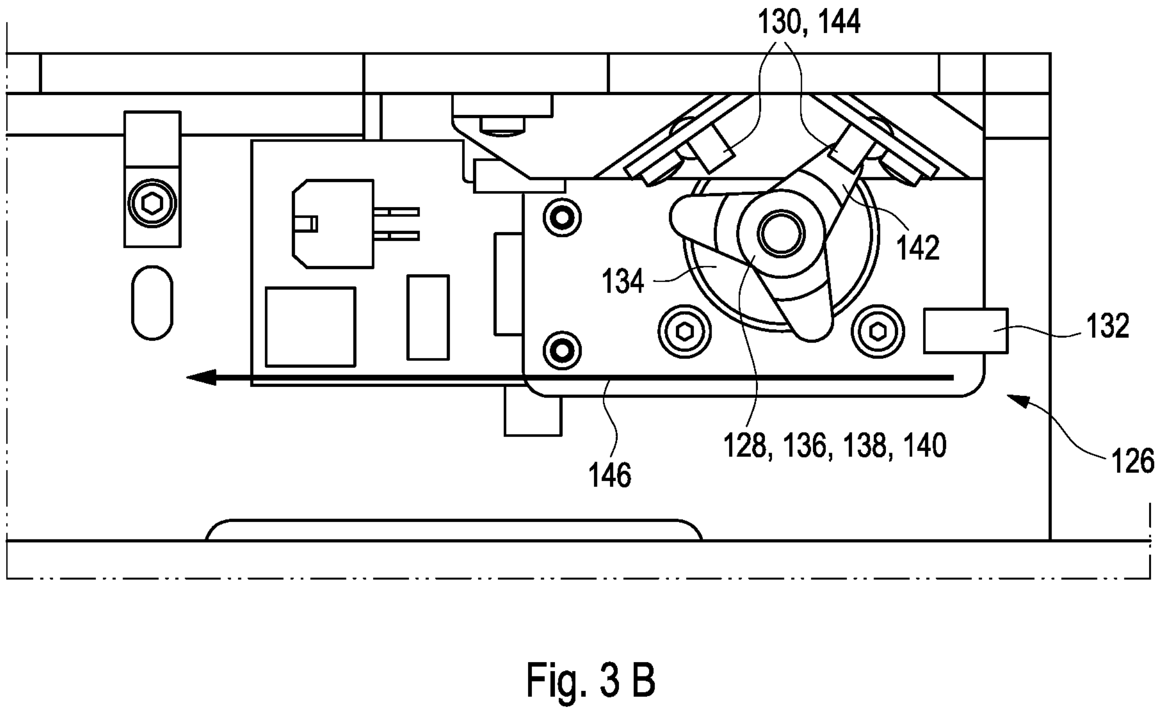

When the reagent storage compartment 118 is inserted into the housing 114 and when the automatic teaching procedure has been completed, a reset process may be performed, e.g. initiated by the control unit 124. In this reset process, the indicator actuator 134, e.g. a stepper motor, may rotate the rotatable movable indicator element 138, e.g. in a clockwise direction, until the rotatable movable indicator element 138 is in the armed position as depicted in FIG. 3A in a perspective view and as depicted in FIG. 3B in a top view. In this armed position, as an example, one of the teeth 142 may be in the position of the readout unit 130, which may comprise a detector for detecting the respective tooth 142. As an example and as depicted in the Figures, the readout unit 132 may comprise at least one light switch 144, such as a light switch 144 comprising a light emitter and a light detector, thereby, as an example, providing for a light barrier which may be interrupted by the respective tooth 142. The respective tooth 142 which presently is in the position of the readout unit 130, specifically in the position of the light switch 144, may, thus, presently act as a detector or indicator tooth.

The control unit 124, as an example, may be configured for obtaining at least one readout signal from the readout unit 130. As an example, every time the laboratory instrument 110 is powered on or restart it, the status of the readout unit 130, specifically the status of the light barrier, may be checked. If one of the teeth 142 of the movable indicator element 136, specifically the rotatable movable indicator element 158, is detected by the light switch 144, the control unit 124 may conclude that the reagent storage compartment 118 has not been removed from the housing 114 and reinserted into the housing 114. Consequently, and generally, the laboratory instrument 110 may not require for an automatic teaching procedure.

Figure 4:
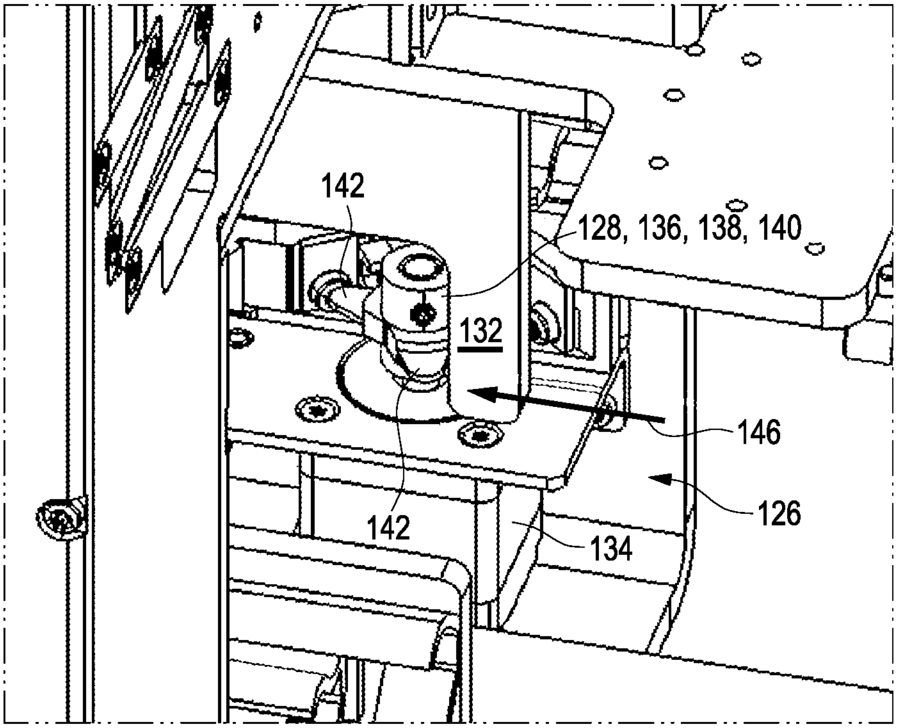
FIG. 4 shows a perspective view of the safety device according to FIGS. 3A and 3B during removal of the reagent storage compartment from the housing and during automatically altering the state of the safety indicator from the armed state into a disarmed state.

On the other hand, when the reagent storage compartment 118 is removed from the housing 114, such as by pulling the drawer 122 out of the housing 114, as e.g. shown in FIGS. 2A and 2B, the compartment actuator 132, e.g. the lever directly or indirectly connected to the reagent storage compartment 118, may move along into the direction of removal of the reagent storage compartment 118. Thus, removing direction, e.g. the direction of pulling out the drawer 122 from the housing 114, is symbolically denoted by an arrow with reference number 146 in FIGS. 3B and 4. Therein, FIG. 3B shows the top view onto the safety device 126 at the beginning of the movement of the reagent storage compartment 118, whereas FIG. 4 shows a perspective view in a situation shortly before the compartment actuator 132 cats in contact with one of the teeth 142.

Figure 5:
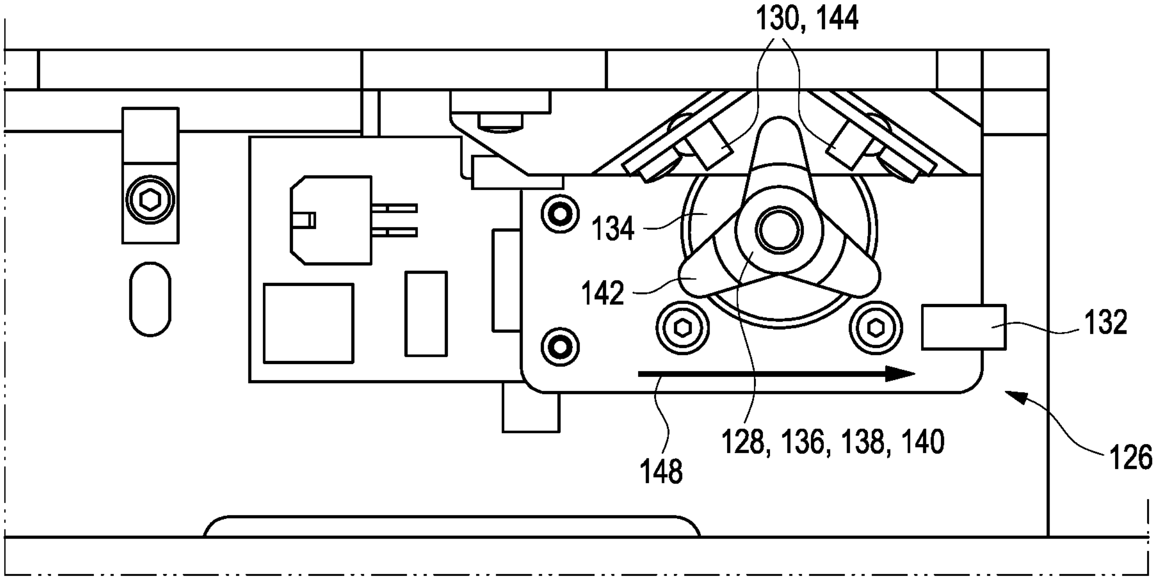
FIG. 5 shows a top view of the safety device according to FIGS. 3A-4 during reinsertion of the reagent storage compartment into the housing.

By interacting with the respective tooth 142, the compartment actuator 132 moves the movable indicator element 136, specifically the rotatable movable indicator element 138, out of the armed position and into a disarmed position as depicted e.g. in a top view shown in FIG. 5. The respective tooth 142 presently being acted upon by the compartment actuator 132 may also be referred to as the actuator tooth. In this disarmed position, the light switch 144 is not blocked by any of the teeth 142 any longer. Thus, the readout unit 130 may generally detect that the movable indicator element 136 is in a disarmed position.

It shall be noted, that the function of the actuator tooth, being acted upon by the compartment actuator 132, and of the detector or indicator tooth, being detected by the readout unit 130, may be fixedly assigned or may change. Thus, as an example, the rotatable movable indicator element 138 may move into only one rotational direction, such that the functions of the actuator tooth and the indicator tooth constantly change.

Furthermore, when the reagent storage compartment 118 is reinserted into the housing 114, e.g. by pushing back the drawer 122 into the housing 114, the compartment actuator 132 may never collide with any of the teeth 142 and, thus, may not act upon the movable indicator element 136. Consequently, the rotatable movable indicator element 138 is not rotated during the reinsertion of the reagent storage compartment 118. In FIG. 5, the direction of reinsertion is symbolically indicated by an arrow having reference number 148.

Consequently, after reinsertion of the reagent storage compartment 118 into the housing 114, the safety indicator 128 may still be in the disarmed position, indicating that the reagent storage compartment 118, since the most recent reset, has been removed from the housing 114 and, subsequently, reinserted into the housing 114. Thus, the control unit 124, by reading evaluating a readout signal of the readout unit 130, may conclude that an automatic training process is required.

Figure 6:
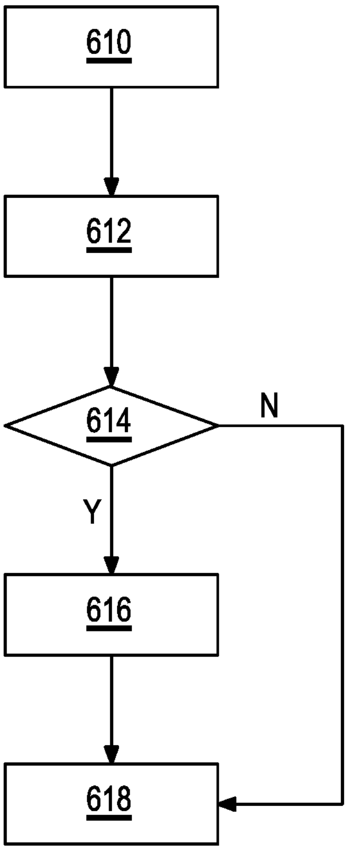
FIG. 6 shows a flow chart of a method of operating the laboratory instrument according to FIGS. 1-5.

In FIG. 6, a flow chart of an embodiment of a method of operating the laboratory instrument 110, such as the laboratory instrument 110 of the embodiment of FIGS. 1-5, is shown. The method, firstly, comprises a step 610 of starting the method, e.g. when the laboratory instrument 110 is powered up and/or at one or more predetermined points in time. Further, the method comprises a step 612 of receiving at least one readout signal from the safety indicator 128, such as from the readout unit 130 of the safety device 126 reading out the position of the safety indicator 128. Further, the method may comprise a step 614 of checking if the readout signal indicates that the reagent storage compartment 118 has been removed from the housing 114 and, optionally, reinserted into the housing 114. If this is the case, indicated by branch "Y" in FIG. 6, the method may proceed with a step 616 of performing at least one automatic teaching procedure of the laboratory instrument 110. Afterwards, the method may proceed with at least one step 618 of sample processing, by using the contents of the reagent storage compartment 118. If, on the other hand, checking step 614 determines that the readout signal indicates that the reagent storage compartment 118 has not been removed from the housing 114 since the last reset, as indicated by branch "N" in FIG. 6, the method may directly step forward to the sample processing step 618, without the necessity of performing the automatic teaching procedure.

As discussed above, the reagent storage compartment 118 specifically may be embodied as a drawer 122, as also depicted in the embodiment shown in FIGS. 2A and 2B. It shall be noted, however, that other options are feasible. In case the reagent storage compartment 118 is embodied as a drawer 122 and/or comprises a drawer 122, the at least one safety indicator 128 specifically may be integrated into a guiding mechanism and/or into at least one guide rail of the drawer 122.

Figure 7A:
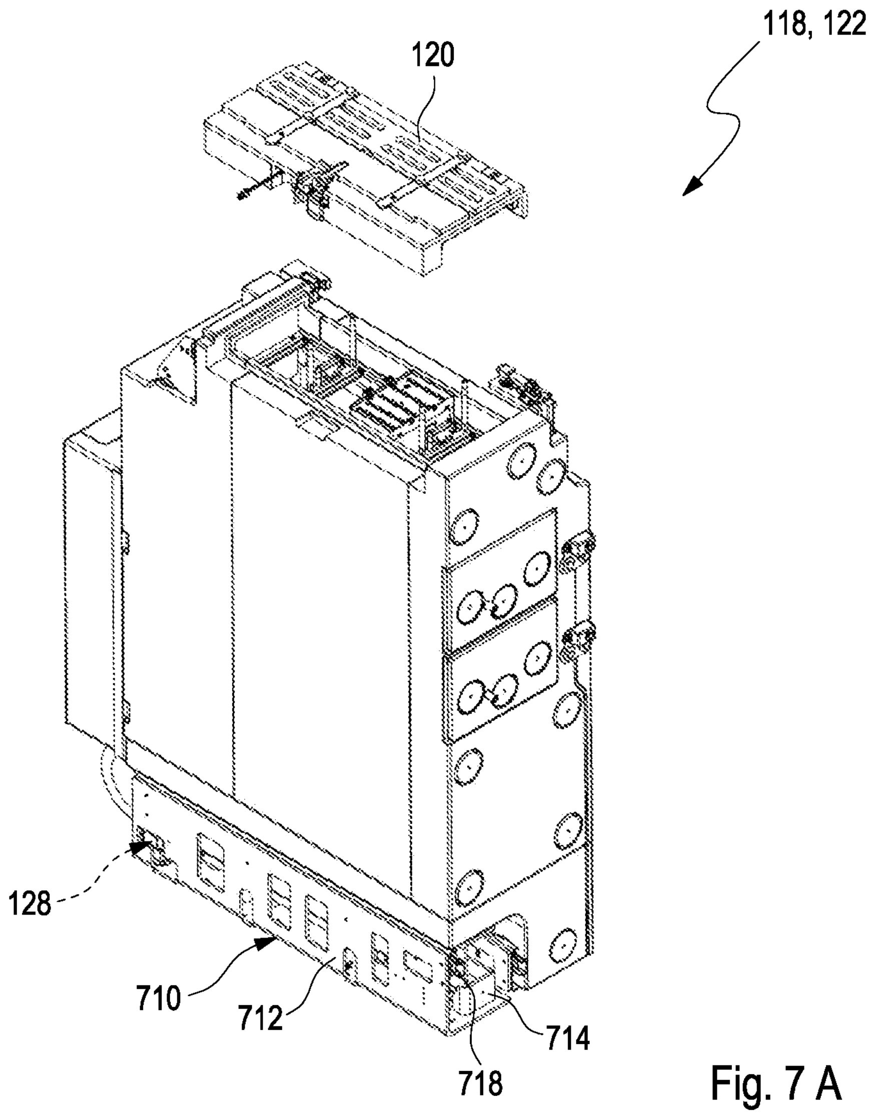
FIGS. 7A and 7B show a perspective view of a reagent storage compartment embodied as a drawer (FIG. 7A) and a detailed perspective view of the guiding mechanism used therein (FIG. 7B).
Figure 7B:
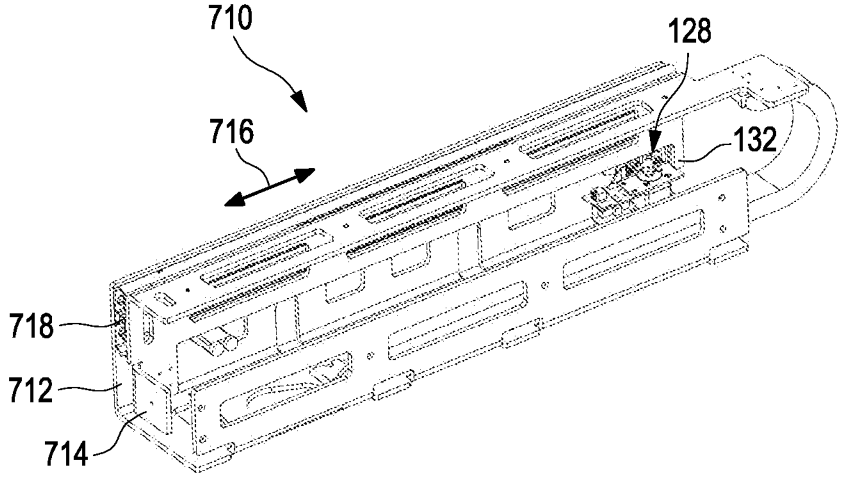

An embodiment of this option is shown in FIGS. 7A and 7B. Therein, FIG. 7A shows a perspective view of a reagent storage compartment 118 embodied as a drawer 122 and a guiding mechanism 710 for integration into the housing 114 of the laboratory instrument 110, such as according to any one of the embodiments shown above. FIG. 7B shows a detailed perspective view of the guiding mechanism 710 with the safety indicator 128. These Figures, in the following, will be explained in conjunction. For possible options of the reagent storage compartment 118 and, of the laboratory instrument 110, reference is made to the embodiments described above.

As shown e.g. in FIG. 7A, the reagent storage compartment 118 may be mounted to the housing 114, which is not visible in this Figure, in a slidable fashion. Thereby, the option of sliding the reagent storage compartment 118 in and out of the housing 114 may be provided, as shown e.g. in FIGS. 2A and 2B above. For this purpose, the guiding mechanism 710 may comprise at least one first part 712, which may be mounted to the housing 114, e.g. inside an opening configured for receiving the reagent storage compartment 118, and/or which may be integral to the housing 114, e.g. inside the above-mentioned opening. Further, the guiding mechanism 710 may comprise at least one second part 714, which may be configured for being mounted to the reagent storage compartment 118 and/or which may be integral to the reagent storage compartment 118.

The first part 712 and the second part 714 may be slidable with respect to each other in at least one sliding direction, as symbolically denoted by the double-headed arrow 716 in FIG. 7B. In order to provide for this sliding motion, the first part 712 and the second part 714 may be connected by at least one guide rail 718. The guide rail 718 may fully or partially be integrated into the first part 712 and/or into the second part 714, or may also be embodied as a separate part. More than one guide rail 718 may also be present.

As shown e.g. in the partial view of FIG. 7B, the safety indicator 128 may be located in between the first part 712 and the second part 714. As an example, the safety indicator 128 may be mounted to the first part 712 and/or may be integrated into the first part 712. The compartment actuator 132, as an example, may be part of the second part 714. Thereby, a motion between the first part 712 and the second part 714 may be detected by the safety indicator 128, specifically by the compartment actuator 132 acting on the safety indicator 128. For further possible details, reference may be made to the description of the embodiments shown above.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

LIST OF REFERENCE NUMBERS

110 Laboratory instrument
112 Sample port
114 Housing
116 Sample processing device
118 Reagent storage compartment
120 Reagent container
122 Drawer
124 Control unit
126 Safety device
128 Safety indicator
130 Readout unit
132 Compartment actuator
134 Indicator actuator
136 Movable indicator element
138 Rotatable movable indicator element
140 Toothed wheel
142 Tooth
144 Light switch
146 Removal direction
148 Direction of reinsertion
610 Method start
612 Receiving readout signal
614 Checking if readout signal indicates removal and reinsertion of reagent storage compartment
616 Performing automatic teaching procedure
618 Sample processing
710 Guiding mechanism
712 First part
714 Second part
716 Sliding direction
718 Guide rail

The invention claimed is:

1. A laboratory instrument for processing at least one sample, the laboratory instrument comprising:
 a. at least one housing having at least one sample processing device disposed therein;
 b. at least one reagent storage compartment reversibly removable from the housing, and
 c. at least one safety indicator, the safety indicator being configured for indicating if the reagent storage compartment has been removed from the housing and reinserted into the housing, wherein the laboratory instrument is configured for automatically altering a detectable state of the safety indicator during the process of removing and reinserting the reagent storage compartment,
 wherein the laboratory instrument is electrically operable in a powered state, wherein the reagent storage compartment is reversibly removable from the housing in an unpowered state, and wherein the safety indicator is configured for indicating if the reagent storage compartment has been removed from the housing and reinserted into the housing during a period in which the laboratory instrument was unpowered;
 wherein the safety indicator comprises at least one movable indicator element configured for being brought into at least one armed position and into at least one disarmed position, and at least one readout unit for detecting whether the movable indicator element is in the armed position or in the disarmed position;
 wherein the laboratory instrument further comprises at least one compartment actuator configured for bringing the movable indicator element from the armed position into the disarmed position when the reagent storage compartment is removed from the housing, and configured for leaving the movable indicator element in the disarmed position when the reagent storage compartment is reinserted into the housing;
 and wherein the laboratory instrument further comprises at least one control unit configured for receiving and evaluating a readout signal indicating a state of the safety indicator and configured for performing at least one automatic teaching procedure when the readout signal indicates that the reagent storage compartment has been removed from the housing and reinserted into the housing.

2. The laboratory instrument of claim 1, wherein the compartment actuator is a mechanical compartment actuator mechanically acting on the movable indicator element.

3. The laboratory instrument of claim 1, wherein the laboratory instrument further comprises at least one indicator actuator, wherein the indicator actuator is configured for bringing the movable indicator element into the armed position.

4. The laboratory instrument of claim 1, wherein the laboratory instrument is configured for mechanically bringing the movable indicator element from the armed position into the disarmed position when the reagent storage compartment is removed from the housing, wherein the laboratory instrument is further configured for leaving the movable indicator element in the disarmed position when the reagent storage compartment is reinserted into the housing, wherein the laboratory instrument is further configured for performing at least one automatic teaching procedure when the movable indicator element is detected to be in the disarmed position and further is configured for bringing the movable indicator element back into the armed position.

5. The laboratory instrument of claim 1, wherein the movable indicator element comprises at least one rotatable movable indicator element, wherein the armed position and the disarmed position are different rotational positions of the rotatable movable indicator element.

6. The laboratory instrument of claim 5, wherein the rotatable movable indicator element comprises at least one toothed wheel having at least one tooth, wherein the reagent storage compartment is configured to mechanically act upon the tooth of the toothed wheel when the reagent storage compartment is removed from the housing, wherein the reagent storage compartment further is configured not to act upon the tooth of the toothed wheel when the reagent storage compartment is reinserted into the housing.

7. The laboratory instrument of claim 6, wherein the toothed wheel comprises at least two teeth, wherein the reagent storage compartment is configured to mechanically act upon at least a first tooth of the teeth, wherein the readout unit further is configured for detecting at least a second tooth of the teeth.

8. A method of operating the laboratory instrument of claim 1, the method comprising:
 i. receiving at least one readout signal from the safety indicator;
 ii. checking if the readout signal indicates that the reagent storage compartment has been removed from the housing;
 iii. depending on the result of step ii., performing at least one automatic teaching procedure of the laboratory instrument.

* * * * *